(12) United States Patent
Yu

(10) Patent No.: US 12,744,996 B2
(45) Date of Patent: Sep. 22, 2026

(54) MOVABLE APPARATUS WITH ADJUSTABLE FRAME RATE IMAGE PROCESSING BY NEURAL PROCESSOR

(71) Applicant: DEEPX CO., LTD., Seongnam-si (KR)

(72) Inventor: Ha Joon Yu, Gimpo-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/970,920

(22) Filed: Dec. 6, 2024

(65) Prior Publication Data

US 2026/0122345 A1 Apr. 30, 2026

(30) Foreign Application Priority Data

Oct. 25, 2024 (KR) ........................ 10-2024-0147623

(51) Int. Cl.

| | |
|---|---|
| ***H04N 23/65*** | (2023.01) |
| ***H04N 7/01*** | (2006.01) |
| ***H04N 23/61*** | (2023.01) |
| ***H04N 23/695*** | (2023.01) |
| ***H04N 23/90*** | (2023.01) |
| *G05D 1/689* | (2024.01) |
| *G05D 109/25* | (2024.01) |

(52) U.S. Cl.

CPC ........... *H04N 23/651* (2023.01); *H04N 7/013* (2013.01); *H04N 23/61* (2023.01); *H04N 23/695* (2023.01); *H04N 23/90* (2023.01); *G05D 1/689* (2024.01); *G05D 2109/254* (2024.01)

(58) Field of Classification Search

CPC .......... G01S 17/10; G01S 17/36; G01S 17/86; G01S 17/894; G01S 17/931; G01S 7/4811; G01S 7/4815; G01S 7/4816; G01S 7/4817

USPC .......................................................... 348/142

See application file for complete search history.

(56) References Cited

U.S. PATENT DOCUMENTS

| | | | | |
|---|---|---|---|---|
| 2017/0336806 | A1* | 11/2017 | Blanc-Paques ...... | G01R 29/085 |
| 2019/0094149 | A1* | 3/2019 | Troy ...................... | G01C 11/02 |
| 2019/0310355 | A1* | 10/2019 | Kerr ....................... | B64U 10/13 |
| 2024/0203552 | A1* | 6/2024 | George .................. | G16H 30/40 |

FOREIGN PATENT DOCUMENTS

| | | | | |
|---|---|---|---|---|
| KR | 102646894 B1 * | 3/2024 | ........... | G06N 3/0464 |

* cited by examiner

*Primary Examiner* — Masum Billah

(74) *Attorney, Agent, or Firm* — WTA IP Law P.C.

(57) ABSTRACT

A movable apparatus is provided. The apparatus may comprise a sensor, a plurality of cameras, a neural processor configured to detect and track an object by receiving images from the plurality of cameras, and a controller circuit configured to determine a moving direction by the sensor, increase a first frame per second (FPS) of a selected camera among the plurality of cameras corresponding to the moving direction, and decrease a second FPS of at least one other camera among the plurality of cameras corresponding to a different direction.

20 Claims, 21 Drawing Sheets

MOVABLE APPARATUS WITH ADJUSTABLE FRAME RATE IMAGE PROCESSING BY NEURAL PROCESSOR

CROSS-REFERENCE TO RELATED APPLICATIONS

This application claims priority to Korean Patent Application No. 10-2024-0147623 filed on Oct. 25, 2024, in the Korean Intellectual Property Office, the disclosure of which is incorporated herein by reference in its entirety.

BACKGROUND OF THE DISCLOSURE

Technical Field

The present disclosure relates to a movable apparatus that detects and tracks a target using visual recognition.

Background Art

Recently, research on movable apparatus equipped with artificial intelligence semiconductors is being conducted.

Examples of mobile devices include automobiles, robots, or drones. For example, a drone is an airplane or helicopter-like unmanned aerial vehicle (UAV) that can be flown and controlled by autonomous flight or by guidance from radio waves without a pilot. For example, robots include bipedal robots, quadrupedal robots, and all-wheel drive robots that can be driven and operated by autonomous or wireless guidance without a pilot. Robots can be used to assist the elderly and disabled, to monitor factories and construction sites, and to perform various labor tasks in factories.

SUMMARY OF THE DISCLOSURE

Embodiments related to a movable apparatus that adjust frame rates of its camera to reduce power consumption. The movable apparatus includes a sensor configured to generate a sensor signal, and a plurality of the cameras to capture images, one or more neural processors and a controller circuit. The one or more neural processors detect and track an object by processing the images captured by the plurality of cameras. The controller circuit determines a moving direction of the movable apparatus by processing the sensor signal. The controller circuit increases a first frame rate of a selected camera among the plurality of cameras corresponding to the moving direction, but decreases a second frame rate of each of one or more cameras other than the selected camera.

In one or more embodiments, the controller circuit further increases the first frame rate and decreases the second frame rate responsive to increase in a speed of the movable apparatus.

In one or more embodiments, the controller circuit transmits a first control signal to an image signal processor (ISP) of the selected camera to control the first frame rate. The controller circuit also transmits a second control signal to an ISP of at least one of the one or more cameras to control the second frame rate.

In one or more embodiments, the movable apparatus includes a camera controller. The camera controller receives a control signal from the controller circuit, and sends frame rate signals to the plurality of cameras to set the first frame rate and the second frame rate in accordance with the control signal.

In one or more embodiments, the camera controller includes a plurality of up/down samplers configured to receive the captured images and increase or decrease a frame rate of the captured images to obtain the first frame rate and the second frame rate, and a multiplexer configured to incorporate the captured images into a stream of images.

In one or more embodiments, a number of the plurality of up/down samplers is the same as a number of the plurality of cameras.

In one or more embodiments, the plurality of up/down samplers include a first up/down sampler and a second up/down sampler.

In one or more embodiments, a first up/down sampler of the plurality of up/down samplers is configured to perform upsampling on images captured by the selected camera to the first frame rate.

In one or more embodiments, a second up/down sampler of the plurality of up/down samplers is configured to perform down-sampling on images captured by each of one or more cameras to the second frame rate.

In one or more embodiments, the multiplexer is further configured to determine a frame sequence for images captured by the first camera and images captured by the second camera of the plurality of cameras based on the moving direction.

In one or more embodiments, the one or more neural processors include a first neural processor and a second neural processor. The first neural processor receives and processes images captured by a first camera of the plurality of cameras to detect and track a target. The second neural processor receives and processes images captured by a second camera to detect and track the target.

In one ore more embodiments, the controller circuit increases a clock frequency of the first neural processor and decreases a clock frequency of the second neural processor.

In one or more embodiments, the one or more neural processors convert a voice command into a text prompt, and utilize a vision-language model to identify and track a target that corresponds to the text prompt.

In one or more embodiments, the one or more neural processors generate a text-based report by processing a vision-language model with the captured images.

In one or more embodiments, the movable apparatus is one of a drone, an unmanned aerial vehicle (UAV), a robot, or an autonomous vehicle.

According to one disclosure of the present disclosure, a user can easily operate the movable apparatus through voice commands. The movable apparatus may automatically detect and track targets. The movable apparatus may describe the situation of the captured video in a particular way. This allows the user to quickly and accurately locate the desired target through voice commands without the need for complex operations, and to understand the status or location of the target in real time through reports generated by the movable apparatus.

DETAILED DESCRIPTION OF THE EMBODIMENT

Figure 1:
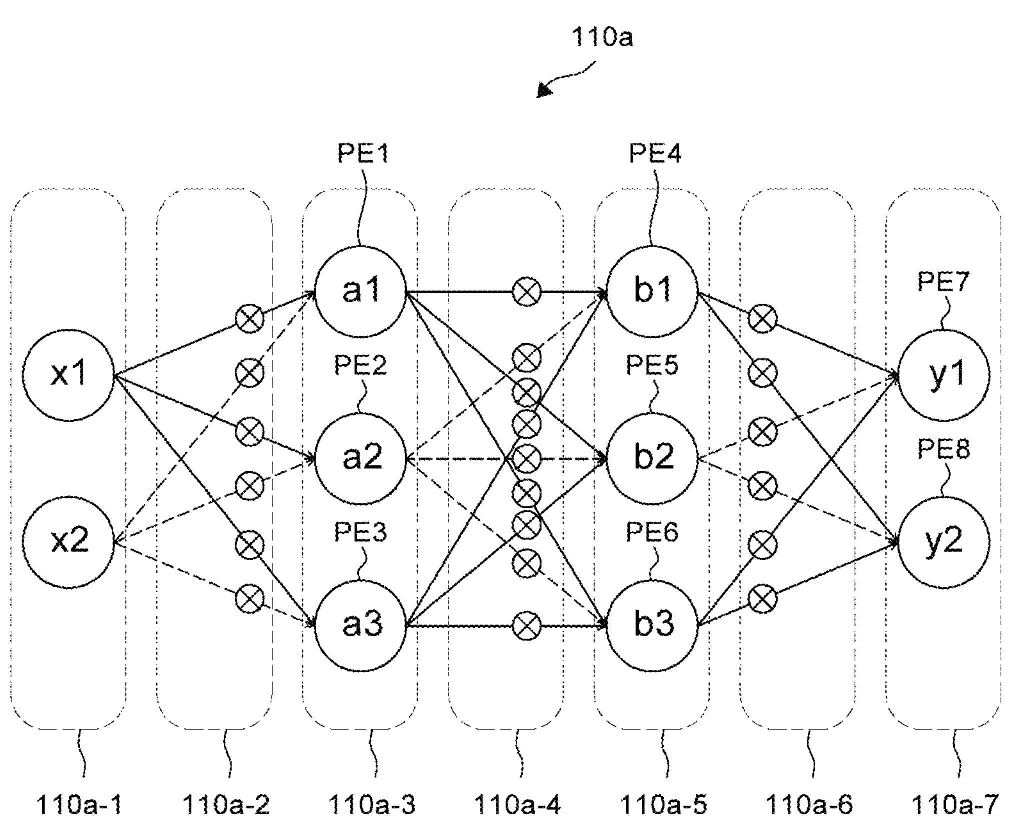
FIG. 1 is a diagram illustrating an exemplary neural network model.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are included in the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present specification are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

When the examples are described, a technology which is well known in the technical field of the present disclosure and is not directly related to the present disclosure will not be described. The reason is that unnecessary description is omitted to clearly transmit the gist of the present disclosure without obscuring the gist.

In describing examples, descriptions of technical contents that are well known in the art to which the present disclosure pertains and are not directly related to the present disclosure will be omitted. This is to more clearly convey the gist of the present disclosure without obscuring it by omitting unnecessary description.

Definitions of Terms

Here, in order to help the understanding of the disclosure proposed in the present specification, terminologies used in the present specification will be defined in brief.

NPU is an abbreviation for a neural processor and refers to a processor specialized for an operation of a neural network model separately from the central processor (CPU).

NN is an abbreviation for a neural network and refers to a network which connects nodes in a layered structure by imitating the connection of the neurons in the human brain through a synapse to imitate the human intelligence.

DNN: An abbreviation for a deep neural network and may mean that the number of hidden layers of the neural network is increased to implement higher artificial intelligence.

CNN: An abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

Artificial Intelligence

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called a neural network model. In other words, a neural network is a system in which nodes that imitate neurons are connected in a layer structure.

These neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, a neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the neural processor by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

FIG. 1 illustrates an exemplary neural network model.

Hereinafter, an operation of an exemplary neural network model 110A which may operate in the neural processor 100 will be explained.

The exemplary neural network model 110A of FIG. 1 may be a neural network trained to perform various inference functions such as object detection or voice recognition.

The neural network model 110A may be a deep neural network (DNN).

However, the neural network model 110A according to the examples of the present disclosure is not limited to the deep neural network.

For example, the neural network model can be a model such as Siamese Network, Triplet Network, Contrastive Loss, FaceNet, DeepID, SphereFace, ArcFace, Small Language Model (SLM), Large Language Model (LLM), Generative Adversarial Networks (GAN), Florence, DaViT, MobileViT, Swin-Transformer, Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the neural network model 110A may be an ensemble model based on at least two different models.

Hereinafter, an inference process by the exemplary neural network model 110A will be described.

The neural network model 110A may be an exemplary deep neural network model including an input layer 110A-1, a first connection network 110A-2, a first hidden layer 110A-3, a second connection network 110A-4, a second hidden layer 110A-5, a third connection network 110A-6, and an output layer 110A-7. However, the present disclosure is not limited only to the neural network model illustrated in FIG. 1. The first hidden layer 110A-3 and the second hidden layer 110A-5 may also be referred to as a plurality of hidden layers.

The input layer 110A-1 may exemplarily include input nodes X1 and X2. That is, the input layer 110A-1 may include information about two input values.

For example, the first connection network 110A-2 may include information about six weight values for connecting nodes of the input layer 110A-1 to nodes of the first hidden layer 110A-3, respectively. Each weight value is multiplied with the input node value, and an accumulated value of the multiplied values is stored in the first hidden layer 110A-3. Here, the nodes and weights may be referred to as parameters of neural network model.

For example, the first hidden layer 110A-3 may include nodes A1, A2, and A3. That is, the first hidden layer 110A-3 may include information about three node values.

The first processing element PE1 of FIG. 1 may perform the MAC operation of the A1 node.

The second processing element PE2 of FIG. 1 may perform the MAC operation of the A2 node.

The third processing element PE3 of FIG. 1 may perform the MAC operation of the A3 node.

For example, the second connection network 110A-4 may include information about nine weight values for connecting nodes of the first hidden layer 110A-3 to nodes of the second hidden layer 110A-5, respectively. The weight value of the second connection network 110A-4 is multiplied with the node value input from the corresponding first hidden layer 110A-3 and the accumulated value of the multiplied values is stored in the second hidden layer 110A-5.

For example, the second hidden layer 110A-5 may include nodes B1, B2, and B3. That is, the second hidden layer 110A-5 may include information about three node values.

The fourth processing element PE4 of FIG. 1 may process the operation of the B1 node.

The fifth processing element PE5 of FIG. 1 may process the operation of node B2.

The sixth processing element PE6 of FIG. 1 may process the operation of node B3.

For example, the third connection network 110A-6 may include information about six weight values which connect nodes of the second hidden layer 110A-5 and nodes of the output layer 110A-7, respectively. The weight value of the third connection network 110A-6 is multiplied with the node value input from the second hidden layer 110A-5, and the accumulated value of the multiplied values is stored in the output layer 110A-7.

For example, the output layer 110A-7 may include nodes Y1 and Y2. That is, the output layer 110A-7 may include information about two node values.

The seventh processing element PE7 of FIG. 1 may process the operation of node Y1.

The eighth processing element PE8 of FIG. 1 may process the operation of node Y2.

Each node may correspond to a feature value, and a feature value can correspond to a feature map.

Figure 2A:
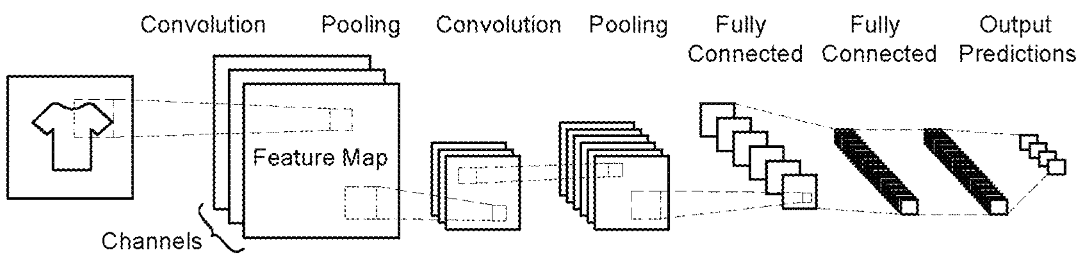
FIG. 2A is a diagram illustrating the basic structure of a convolutional neural network (CNN).

FIG. 2A is a diagram for explaining the basic structure of a convolutional neural network (CNN).

Referring to FIG. 2A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
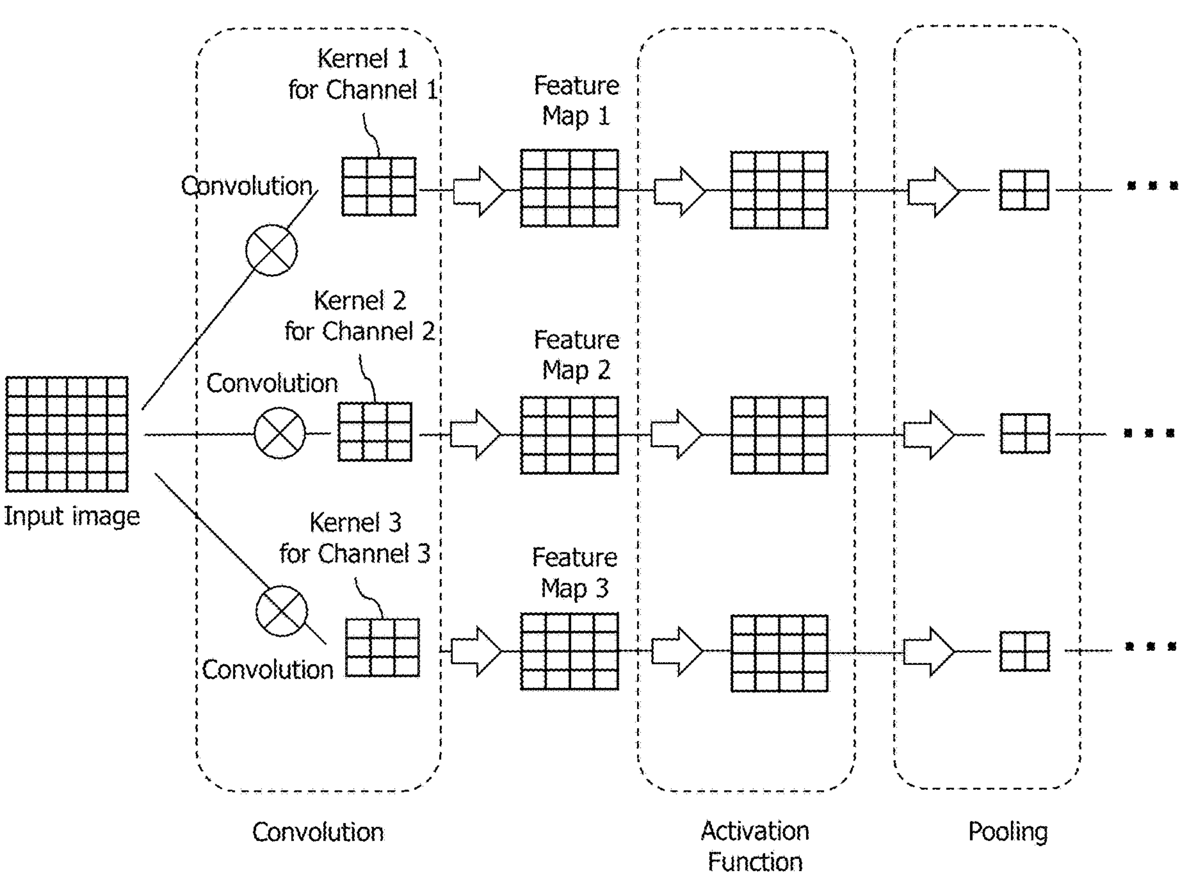
FIG. 2B is a comprehensive diagram illustrating the operation of a convolutional neural network.

FIG. 2B is a comprehensive diagram showing the operation of a convolutional neural network.

Referring to FIG. 2B, an input image is exemplarily represented as a two-dimensional matrix having a size of 6×6. In addition, FIG. 2B exemplarily illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the neural processor 100 are configured to perform a MAC operation.

Next, the operation of the activation function will be described.

The feature map 1, the feature map 2, and the feature map 3 (which are represented as 4×4 examples in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

Figure 8:
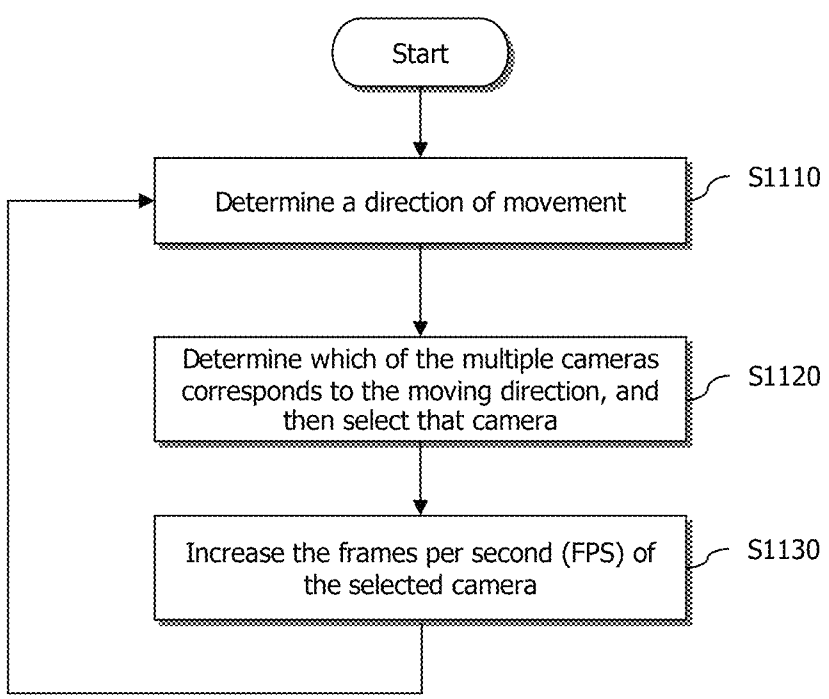
FIG. 8 is a flow diagram illustrating a first scheme of the first disclosure, according to one embodiment.

The aforementioned convolution, activation function, and pooling are repeated, and finally, it can be output as fully connected as shown in FIG. 8. The corresponding output may be input again to a neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

<Required Hardware Resources for NN>

Figure 3:
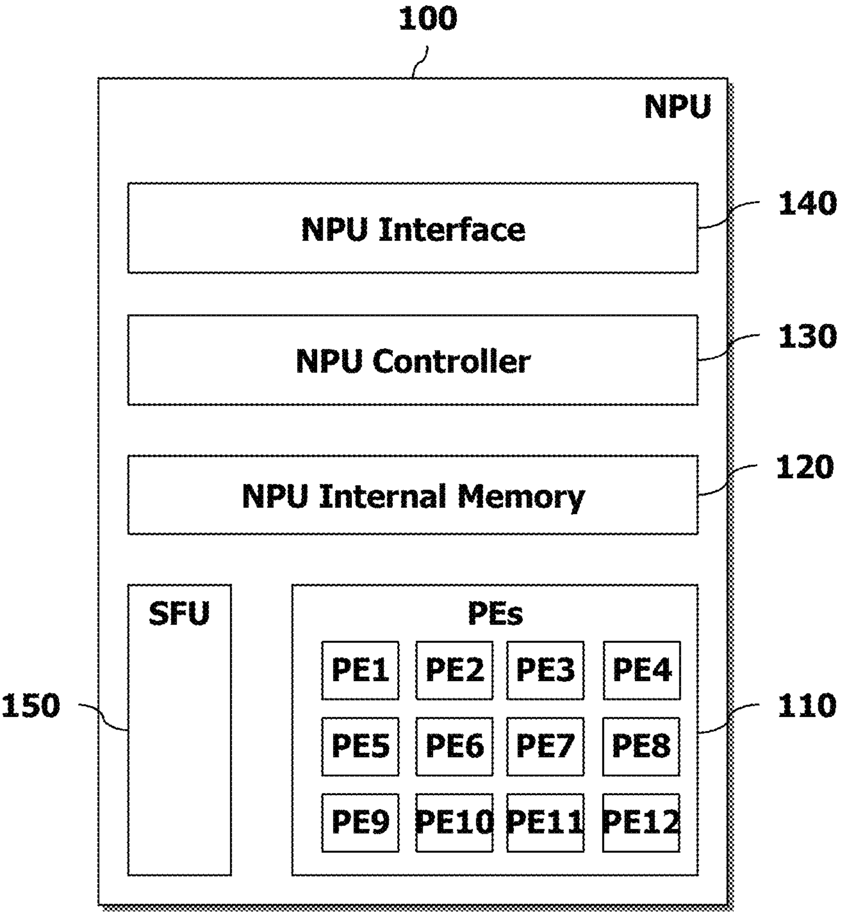
FIG. 3 is a diagram illustrating a neural processor according to the present disclosure.

FIG. 3 is a schematic conceptual diagram illustrating a neural processor according to the present disclosure.

Referring to FIG. 3, a neural processor (NPU) 100 is a processor specialized to perform an operation for a neural network.

The neural network refers to a network in which are collected artificial neurons which, when various inputs or entry stimulations, multiply a weight by the inputs or stimulations, add the multiplied values, and convert a value obtained by additionally adding a deviation using an active function to transmit. The neural network trained as described above may be used to output an inference result from input data.

The neural processor 100 may be a semiconductor device implemented by an electric/electronic circuit. The electric/electronic circuit may refer to a circuit including a large number of electronic elements (transistors, capacitors, and the like).

In the case of a transformer and/or CNN-based neural network model, the neural processor 100 may select and process matrix multiplication operations, convolution operations, and the like according to the architecture of the neural network.

For example, in each layer of a convolutional neural network (CNN), an input feature map corresponding to input data and a kernel corresponding to weights may be a matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for additional algorithms.

The neural processor 100 may be configured to include a plurality of processing elements 110 for processing convolution and matrix multiplication necessary for the above-described neural network operation.

The neural processor 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described neural network operation.

For example, the neural processor 100 may be configured to include the special function unit (SFU) 150 for processing at least one of activation function operation, pooling operation, stride operation, batch-normalization operation, skip-connection operation, concatenation operation, quantization operation, clipping operation, and padding operation for the above-described algorithms.

The neural processor 100 may include a plurality of processing elements (PE) 110, an internal memory 120, a controller 130, and a neural processor interface 140. Each of the plurality of processing elements 110, the internal memory 120, the controller 130, and the neural processor interface 140 may be a semiconductor circuit to which a large number of the electronic elements are connected. Therefore, some of electronic elements may be difficult to identify or be distinguished with the naked eye, but may be identified only by an operation.

For example, an arbitrary circuit may operate as a plurality of the processing elements 110, or may operate as a controller 130. The controller 130 may be configured to perform the function of the control unit configured to control the neural network inference operation of the neural processor 100.

The neural processor 100 may include the plurality of processing elements 110, the internal memory 120 configured to store a neural network model inferred from the plurality of processing elements 110, and the controller 130 configured to control the operation schedule with respect to the plurality of processing elements 110 and the internal memory 120.

The neural processor 100 may be configured to process the feature map corresponding to the encoding and decoding method using SVC (scalable video coding) or SFC (Scalable Feature Coding). The above methods are techniques for variably varying the amount of data transmission according to the effective bandwidth and signal to noise ratio (SNR) of the communication channel or communication bus. In other words, the neural processor 100 may be configured to further comprise an encoder and a decoder.

The plurality of processing elements 110 may perform an operation for a neural network.

SFU 150 may perform another portion of the operation for the neural network.

The neural processor 100 may be configured to hardware-accelerate the computation of the neural network model using the plurality of processing elements 110 and the SFU 150.

The interface circuit 140 of the neural processor may communicate with various components connected to the neural processor 100, for example, memories, via a system bus.

The controller 130 may include a scheduler configured to control the operation of multiple processing elements 110 for inference operations of a neural processor 100, as well as operations of the SFU 150 and reading and writing order of the internal memory 120 of the neural processor.

The controller 130 may be configured to control the plurality of processing elements 110, the SFU 150, and the internal memory 120 based on data locality information or structure information of the neural network model.

The controller 130 may analyze or receive analyzed information on a structure of a neural network model which may operate in the plurality of processing elements 110. For example, data of the neural network, which may be included in the neural network model may include node data (i.e., feature map) of each layer, data on a layout of layers, locality information of layers or information about the structure, and at least a portion of weight data (i.e., weight kernel) of each of connection networks connecting the nodes of the layers. The data of the neural network may be stored in a memory provided in the controller 130 or the internal memory 120. However, without limitation, the data of the neural network model may be stored in a separate cache memory or register file provided in the neural processor or a system on chip (SoC) comprising the neural processor.

The controller 130 may schedule an operation order of the neural network model to be processed by a neural processor 100 based on the data locality information or the information about the structure of the neural network model.

The controller 130 may receive scheduling information of a sequence of operations of the neural network model to be performed by the neural processor 100 based on information about data locality or structure of the compiled neural network model. For example, the scheduling information may be information generated by a compiler. The scheduling information generated by the compiler may be included in machine code, binary code, or the like.

In other words, the scheduling information utilized by the controller 130 may be information generated by a compiler based on data locality information or structure of the neural network model.

In other words, the compiler may efficiently schedule operations of the neural processor according to how well it understands and reconstructs the data locality of the neural network, which is a unique characteristic of the neural network model.

Additionally, the compiler may efficiently schedule the operations of a neural processor according to how well it understands the hardware architecture and performance of the neural processor 100.

Additionally, when the neural network model is compiled by the compiler to be executed on the neural processor 100, the neural network data locality may be reconfigured. The neural network data locality may be reconfigured according to the algorithms applied to the neural network model and the operation characteristics of the processor.

In some embodiments, the neural network data locality may be reconstructed according to how the neural processor 100 processes the neural network model, e.g., feature map tiling, a type of stationary processing of processing elements, and the like.

Additionally, the neural network data locality may be reconstructed according to the number of processing elements of the neural processor 100, the capacity of the internal memory, and the like.

Additionally, the neural network data locality may be reconfigured according to the bandwidth of the memory communicating with the neural processor 100.

This is because each of the factors described above may cause the neural processor 100 to determine the order of data required at each clock instant differently, even when computing the same neural network model.

The compiler may determine that the order of data required for computing the neural network model is data locality based on the order of computing the layers, unit convolution, and/or matrix multiplication of the neural network, and generate the compiled machine code.

The controller 130 may be configured to utilize the scheduling information contained in the machine code.

Based on the scheduling information, the controller 130 may obtain a memory address value where the feature maps and weight data of the layers of the neural network model are stored.

The controller 130 may acquire a memory address value in which feature map of a layer of the neural network model and weight data are stored based on the data locality information or the information about the structure of the neural network model. For example, the controller 130 may acquire the memory address value of the feature map of the layer of the neural network model and the weight data which are stored in the memory. Accordingly, the controller 130 may acquire feature map of a layer and weight data of a neural network model to be driven from the main memory, to store the acquired data in the internal memory 120.

Feature map of each layer may have a corresponding memory address value.

Each of the weight data may have a corresponding memory address value.

The controller 130 may receive scheduling information about the order of operations of the plurality of processing elements 110 based on information about the data locality information or structure of the neural network model, such as batch data, locality information, or information about the structure of layers of the neural network model. The scheduling information may be generated during a compilation step.

The controller 130 may schedule based on the data locality information or the information about the structure of the neural network model so that the neural processor may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the controller 130 may control the neural processor 100 according to a determined processing order of the neural processor 100 based on the data locality information or the information about the structure of the neural network model.

Moreover, the controller 130 may operate the neural processor 100 according to the determined the processing order based on the data locality information or the information about the structure of the neural network model and/or data locality information or information about a structure of the neural processor 100 to be used.

However, the present disclosure is not limited to the data locality information or the information about the structure of the neural processor 100.

The controller 130 may be configured to store the data locality information or the information about the structure of the neural network.

That is, even though only the data locality information or the information about the structure of the neural network of the neural network model is utilized, the controller 130 may determine a processing sequence.

Moreover, the controller 130 may determine the processing order of the neural processor 100 by considering the data locality information or the information about the structure of the neural network model and data locality information or information about a structure of the neural processor 100. Furthermore, optimization of the processing is possible according to the determined processing order.

That is, the controller 130 may be configured to operate based on machine code compiled from a compiler, but in other examples, the controller 130 may be configured to include an embedded compiler. According to the configurations described above, the neural processor 100 may be configured to generate machine code upon input of files in the form of frameworks of various AI software. For example, frameworks of AI software may include TensorFlow, PyTorch, Keras, XGBoost, mxnet, DARKNET, ONNX, and the like.

The plurality of processing elements 110 refers to a configuration in which a plurality of processing elements PE1 to PE12 configured to operate feature map and weight data of the neural network is disposed. Each processing element may include a multiply and accumulate (MAC) operator and/or an arithmetic logic unit (ALU) operator, but the examples according to the present disclosure are not limited thereto.

Each processing element may be configured to optionally further include an additional special function unit for processing the additional special functions.

For example, it is also possible for the processing element PE to be modified and implemented to further include a batch-normalization unit, an activation function unit, an interpolation unit, and the like.

The SFU 150 may include circuits configured to process skip-connection operations, activation function operations, pooling operations, quantization/dequantization operations, non-maximum suppression (NMS) operations, softmax operations, batch-normalization operations, interpolation operations, concatenation operations, clipping operations, padding operations, bias operations, and the like in accordance with the architecture of the neural network model. In other words, the SFU 150 may include a plurality of circuits for processing the special functions.

Although FIG. 3 illustrates a plurality of processing elements as an example, operators implemented by a plurality of multiplier and adder trees may also be configured to be disposed in parallel in one processing element, instead of the MAC. In this case, the plurality of processing elements 110 may also be referred to as at least one processing element including a plurality of operators.

Figure 5:
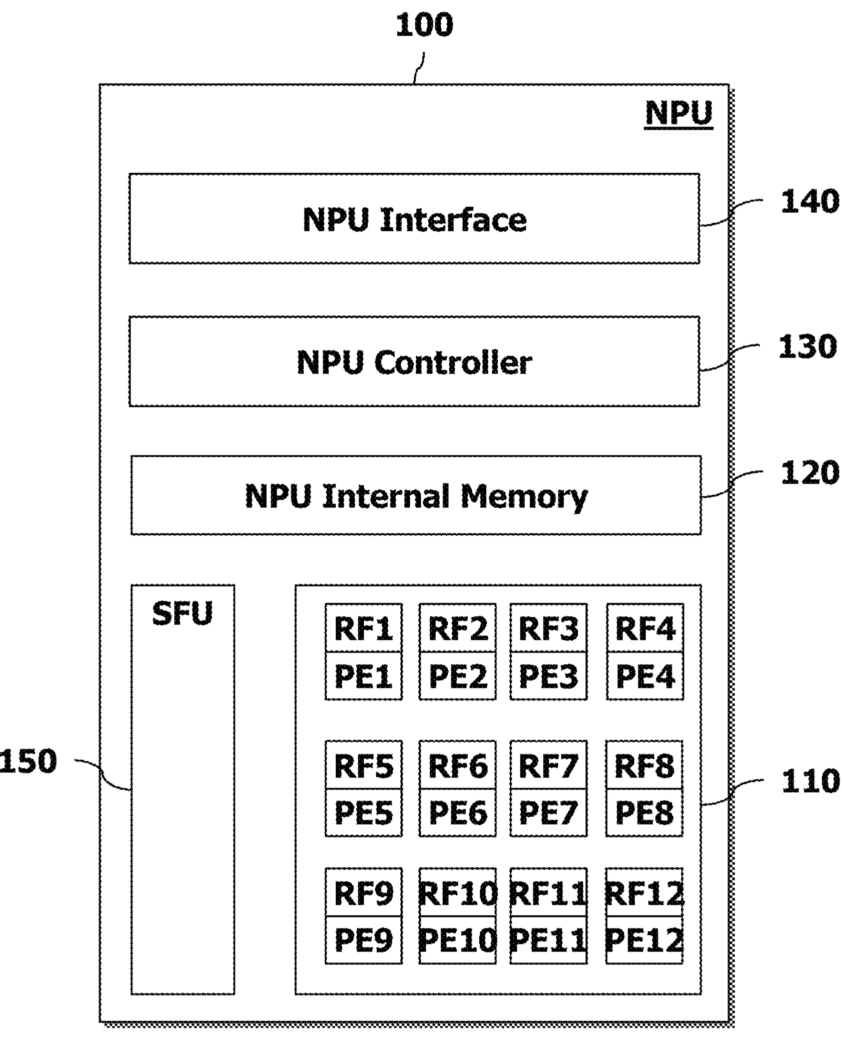
FIG. 5 is a diagram illustrating a modified example of the neural processor 100 shown in FIG. 3.

The plurality of processing elements 110 is configured to include a plurality of processing elements PE1 to PE12. The plurality of processing elements PE1 to PE12 of FIG. 5 is just an example for the convenience of description and the number of the plurality of processing elements PE1 to PE12 is not limited. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the neural network model in which the neural processor 100 operates.

The plurality of processing elements 110 is configured to perform a function such as addition, multiplication, and accumulation required for the neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
FIG. 4A is a diagram illustrating one processing element among a plurality of processing elements that may be applied to the present disclosure.
Figure 4A:
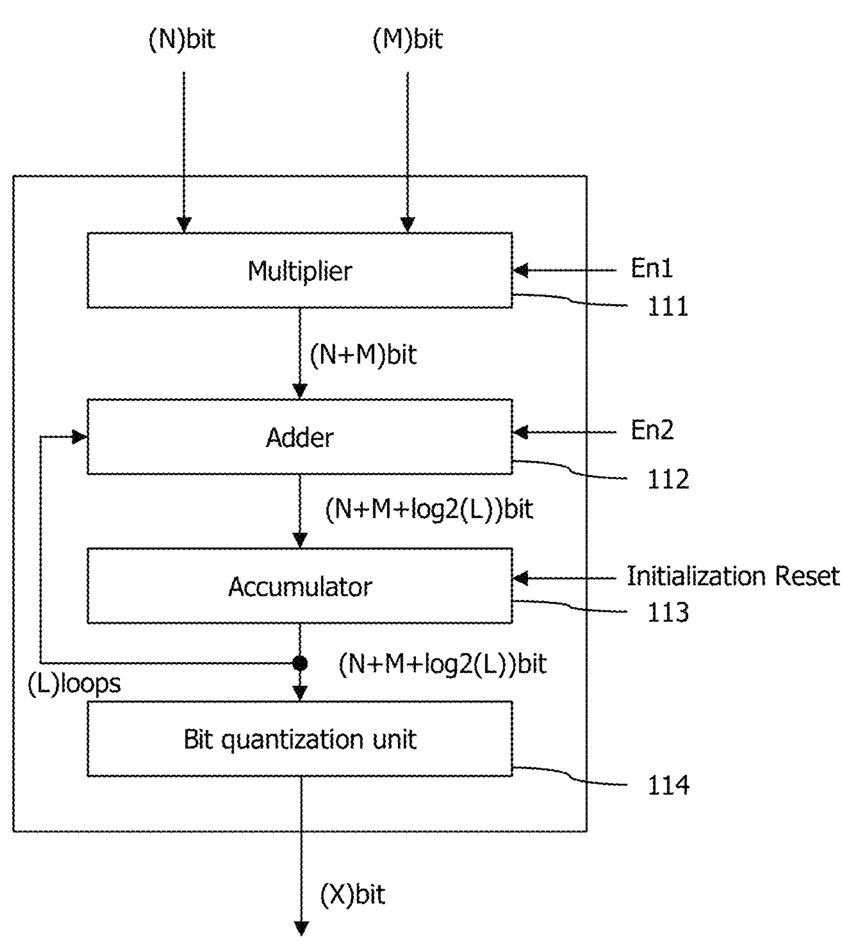

FIG. 4A illustrates one processing element among a plurality of processing elements that may be applied to the present disclosure.

Referring to FIG. 4A, the processing element (PE) may be configured to include a multiplier 111, an adder 112, an accumulator 113, and a bit quantizer 114. However, the examples according to the present disclosure are not limited thereto, and the plurality of processing elements may be modified to take into account the computational characteristics of the neural network model.

The multiplier 111 multiplies the input (N)-bit data with the (M)-bit data. The result of the multiplier 111 operation is output as (N+M)-bit data. Where N and M are integers greater than zero. The first input receiving the (N)-bit data may be configured to receive a value having a variable characteristic, and the second input receiving the (M)-bit data may be configured to receive a value having a constant characteristic. However, the input data of the multiplier 111 is not limited to constant values and variable parameters. For example, a learned weight parameter in a neural network model may have a constant characteristic with respect to a processing element. For example, input values (e.g., activation parameters, feature map parameters, attention parameters, KV cache parameters, and the like) that are calculated as weights in the neural network model may have variable characteristics based on the processing element.

In other words, according to the examples of the present disclosure, the input data of the processing element can be operated by understanding the characteristics of the constant parameters and variable parameters, which can improve the computation efficiency of the neural processor 100. However, the neural processor 100 is not limited to the characterization of the constant parameters and variable parameters of the input data.

Here, the meaning of a parameter having a variable characteristic means that, in the case of the parameter of the memory address where the value is stored, it is updated every time the incoming input data is updated. For example, the node data of each layer may be a MAC operation value reflecting the weight data of a neural network model, and when inferring object detection from video data with such a neural network model, the parameter at the node of each layer will change because the input video changes every frame.

Here, the meaning of a parameter having a constant means that the value at the memory address where the value is stored is preserved regardless of the update of incoming input data. For example, the weight data of a connection network may be a unique inference judgment criterion of a neural network model, and the trained weight data of the connection network may not change even if the neural network model is used to infer object detection of video data, and the like.

That is, the multiplier 111 may be configured to receive inputs of one variable and one constant. More particularly, the variable parameter input to the first input may be node data of a layer of the neural network model, wherein the node data may be input data of an input layer of the neural network model, accumulated values of a hidden layer, and accumulated values of an output layer. The constant parameter input to the second input may be weight data of a connection network of the neural network model.

The controller 130 may be configured to improve memory reuse by considering characteristics of the constant values.

The variable parameters are computation values of each layer, and the controller 130 may recognize reusable variable parameters based on the machine code of the compiled neural network model, and control the internal memory 120 to reuse the parameter.

The constant parameters are the weight data of each connection network, and the controller 130 may recognize the constant parameters of the repeatedly used connection networks based on the structure data of the neural network model or the neural network data locality information, and may control the internal memory 120 to reuse the parameters stored in the internal memory 120. Reusing the parameters means that the parameters stored in the internal memory 120 are not deleted or otherwise copied or moved to the internal memory 120, but are reused in the next operation. According to the above-described configuration, it has the effect of reducing power consumption according to the operation of the internal memory 120. Furthermore, it has the effect of eliminating a delay time that occurs when the neural processor 100 transmits data to and from the internal memory 120.

That is, the controller 130 may receive information on reusable variable parameters and reusable constant parameters based on the machine code of the compiled neural network model. Accordingly, the controller 130 may be configured to control the internal memory 120 to reuse the parameters stored in the memory.

The processing element may disable the operation of the multiplier 111 such that when a zero is input to an input of one of the first input and the second input of the multiplier 111, the multiplier 111 may not perform an operation because the processing element knows that the result of the operation will be zero even if the operation is not performed.

For example, when a zero is input to an input of one of the first input and the second input of the multiplier 111, the multiplier 111 may be configured to operate in a zero-skipping manner.

For zero-skipping, each of the processing elements PEs included in the plurality of processing elements 110 may be enabled or disabled, respectively. The controller 130 may be configured to provide an enable or disable signal to each of the processing elements PEs on a clock basis to each of the processing elements PEs. Here, when the processing element PE is disabled, the multiplier 111 may be configured to be disabled according to a level of the first enable signal En1. Accordingly, the power consumed in the operation of the multiplier 111 may be reduced.

For zero-skipping, each of the processing elements PEs included in the plurality of processing elements 110 may be enabled or disabled, respectively. The controller 130 may be configured to provide an enable or disable signal to each of the processing elements PEs on a clock basis to each of the processing elements PEs. Here, when the processing element PE is deactivated, the adder 112 may be configured to deactivate according to a level of the second enable signal En2. Accordingly, the power consumed in the operation of the adder 112 may be reduced. In some examples, each of the processing elements PEs may be designed to receive a respective control signal from the controller 130 for controlling (i.e., enabling or disabling) the zero-skipping operation.

In some examples, each multiplier 111 of each processing element PE may be designed to receive a respective control signal for controlling the zero-skipping operation from the controller 130. According to the above-described configuration, the power consumption of the multipliers may be reduced by zero-skipping.

In some examples, each adder 112 of each processing element PE may be designed to receive input from the controller 130 a respective control signal for controlling the zero-skipping operation. According to the configurations described above, the power consumption of the adders may be reduced by zero-skipping.

In some examples, each of the multiplier 111 and adder 112 of each processing element PE may be designed to simultaneously receive a respective control signal for controlling the zero-skipping operation from the controller 130. According to the above-described configuration, the power consumption of the multipliers and adders may be reduced by zero-skipping.

In some examples, the weights are constant parameters that have been trained, and the machine code from which the neural network model comprising the weights has been compiled may be programmed to input respective control signals for controlling the zero-skipping operation to respective processing elements (PEs) where values with zero weights are input.

The bitwidth of data input to the first input and the second input may be determined according to the quantization of the node data and the weight data of the respective layers of the neural network model. For example, the node data of the first layer may be quantized to 5 bits and the weight data of the first layer may be quantized to 7 bits. In such a case, the first input may be configured to receive 5-bit data and the second input may be configured to receive 7-bit data, i.e., the number of bits of data input to each input may be different.

The processing element (PE) may be configured to receive quantization information of the data input to each input. The neural network data locality information may include quantization information of the input data and output data of the processing element PE.

The neural processor 100 may control that when the quantized data stored in the internal memory 120 is input to the inputs of the processing element, the number of quantized bits may be converted in real time. That is, the number of quantized bits may be different for different layers, and the processing element may be configured to generate the input data by converting the number of bits in real time by receiving the bit count information from the neural processor 100 in real time when the number of bits of the incoming data is converted.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The accumulator 113 may be configured to store the accumulated value even when zero skipping is enabled in the corresponding processing element PE. Thus, subsequent values can be accumulated even when zero skipping is activated.

The bit quantizer 114 may reduce the bit width of the data output from the accumulator 113. The bit quantizer 114 may be controlled by the controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Specifically, when the heat generation is reduced, the possibility of the erroneous operation of the neural processor 100 due to the high temperature may be reduced.

Output data (X) bits of the bit quantizer 114 may serve as node data of a subsequent layer or input data of a convolution. When the neural network model is quantized, the bit quantizer 114 may be configured to be supplied with quantized information from the neural network model. However, it is not limited thereto and the controller 130 may also be configured to extract quantized information by analyzing the neural network model. Accordingly, the output data (X) bit is converted to a quantized bit width to be output so as to correspond to the quantized data size. The output data (X) bit of the bit quantizer 114 may be stored in the internal memory 120 with a quantized bit width.

The plurality of processing elements of the neural processor 100 according to one example of the present disclosure may include a multiplier 111, an adder 112, an accumulator 113, and a bit quantization unit 114. The plurality of processing elements may reduce a number of bits of data of (N+M+log 2(L))bits output from the accumulator 113 by the bit quantization unit 114 to a number of bits of (X) bits. The controller 130 may control the bit quantization unit 114 to reduce the number of bits of the output data by a predetermined number of bits from the least significant bit (LSB) to the most significant bit (MSB). Reducing the number of bits in the output data may have the effect of reducing power consumption, computation, and memory usage. However, if the number of bits is reduced below a certain length, the inference accuracy of the neural network model may decrease rapidly. Therefore, the quantization level, i.e., the reduction of the number of bits in the output data, can be determined by comparing the degree of reduction in power consumption, computation, and memory usage with the degree of reduction in the inference accuracy of the neural network model. The quantization level may be determined by determining a target inference accuracy of the neural network model and testing the neural network model with a progressively reduced number of bits. The quantization level may be determined for each layer of the neural network model separately.

According to the processing element (PE) described above, by adjusting the number of bits of (N) bit data and (M) bit data of the multiplier 111, and by reducing the number of bits of the operation value (X) bit by the bit quantization unit 114, the plurality of processing elements has the effect of improving the MAC operation speed while reducing the power consumption, and also has the effect of making the convolution operation of the neural network model more efficient.

Figure 4B:
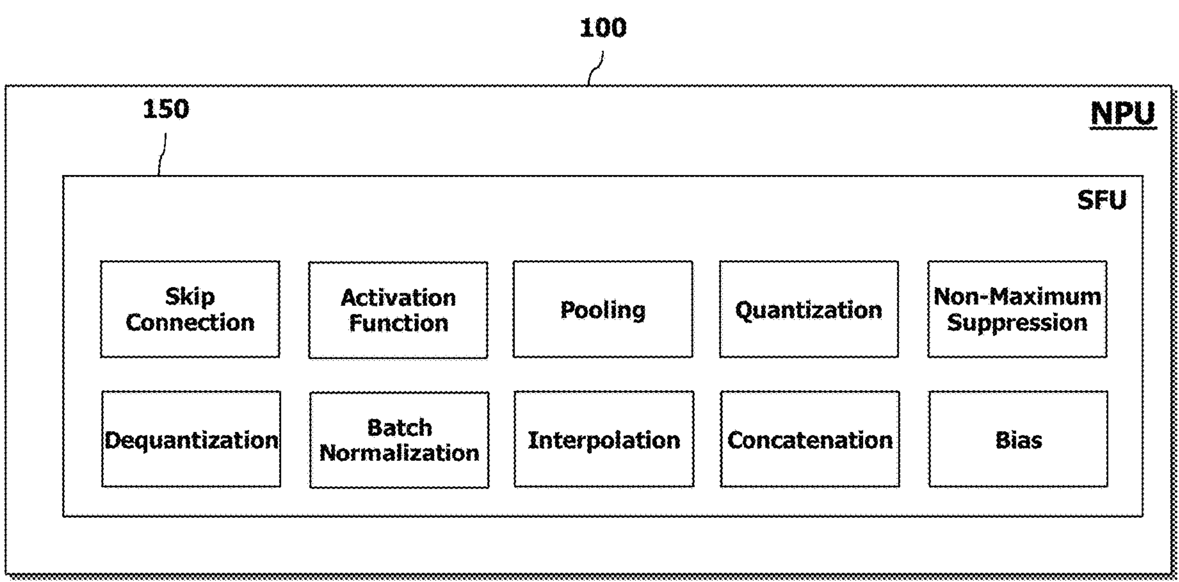
FIG. 4B is a diagram illustrating an SFU that can be applied to the present disclosure.

FIG. 4B is a schematic conceptual diagram illustrating an SFU that can be applied to the present disclosure.

Referring to FIG. 4B, the SFU 150 may include several functional units. Each functional unit can be operated selectively. Each functional unit can be selectively turned on or turned off. That is, each functional unit can be set.

In other words, the SFU 150 may include various circuit units required for a neural network inference operation.

For example, the circuit units of the SFU 150 may include a functional unit for skip-connection operation, a functional unit for activation function operation, a functional unit for pooling operation, a functional unit for quantization/dequantization operation, a functional unit for non-maximum suppression (NMS) operation, a functional unit for softmax operation, a functional unit for a batch-normalization operation, a functional unit for interpolation operation, a functional unit for concatenation operation, a functional unit for bias operation, and the like.

Functional units of the SFU 150 may be selectively turned on or off according to the special function information of the neural network model. The special function information of a neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the neural processor 100 can be reduced. Meanwhile, in order to turn off some functional units, power gating may be used. Alternatively, clock gating may be performed to turn off some functional units.

FIG. 5 illustrates a modified example of the neural processor 100 of FIG. 3.

The neural processor 100 of FIG. 5 is substantially the same as the neural processor 100 illustrated in FIG. 3, except for the plurality of processing elements 110. Thus, redundant description will be omitted for the convenience of description.

The plurality of processing elements 110 exemplarily illustrated in FIG. 5 may further include register files RF1 to RF12 corresponding to processing elements PE1 to PE12 in addition to a plurality of processing elements PE1 to PE12.

The plurality of processing elements PE1 to PE12 and the plurality of register files RF1 to RF12 of FIG. 5 are just an example for the convenience of description and the number of the plurality of processing elements PE1 to PE12 and the plurality of register files RF1 to RF12 is not limited.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the neural network model in which the neural processor 100 operates. For additional explanation, the memory size of the register file may be determined in consideration of a data size, a required operating speed, and a required power consumption of the neural network model to operate.

The register files RF1 to RF12 of the neural processor 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the internal memory 120.

It is also possible that the register files RF1 to RF12 are configured to perform a function of a temporary memory of the accumulator during MAC operation.

In some examples, the plurality of processing elements 110 may be implemented as one or more adder-trees.

<Example Movable Apparatus>

Figure 6A:
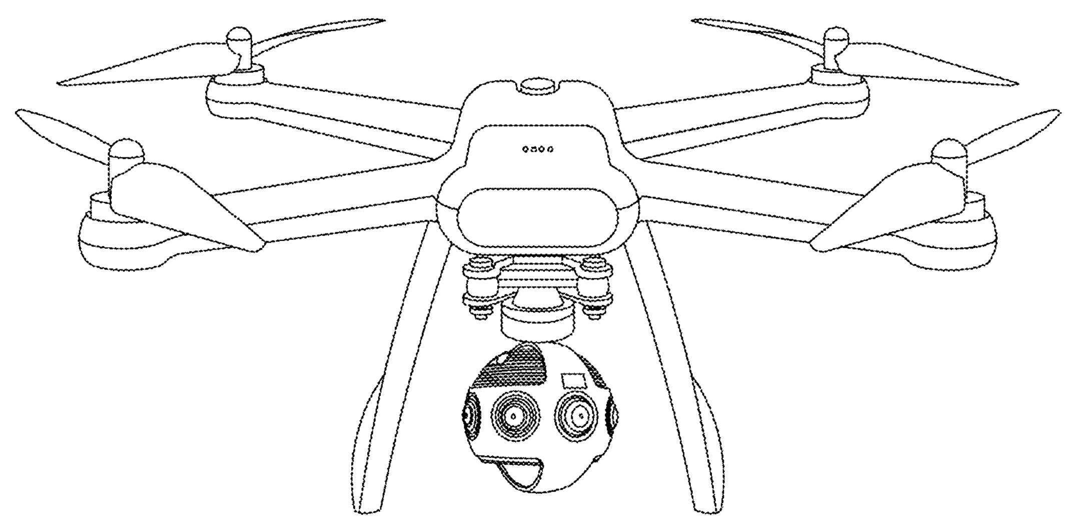
FIG. 6A illustrates a drone having multiple cameras (i.e., multi-channel cameras), according to an embodiment.
Figure 6B:
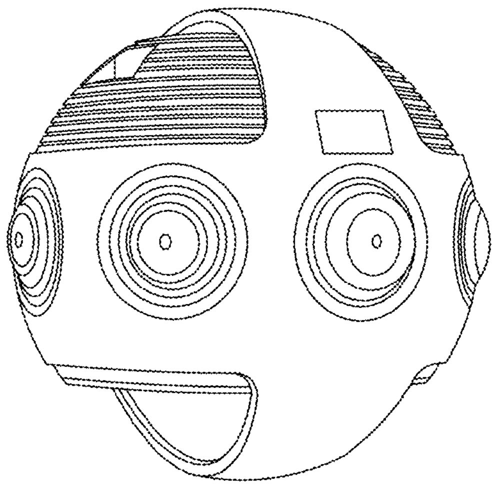
FIG. 6B illustrates multiple cameras mounted on the drone, according to one embodiment.

FIG. 6A illustrates a drone having multiple cameras (i.e., multi-channel cameras), and FIG. 6B illustrates multiple cameras mounted on the drone, according to one embodiment. As can be seen with reference to FIG. 6A, the multiple cameras are mounted on the lower side of the drone. However, according to an embodiment, a multi-camera (or multi-channel camera) may be installed on the one side of the drone.

As can be seen with reference to FIG. 6B, the multiple cameras (or multi-channel cameras) may be cameras capable of photographing a front side, a rear side, a left side, a right side, and the like.

In some examples, the multiple cameras may be installed on a robot, autonomous vehicle, and the like. The multiple cameras may be two cameras arranged to take different views from different angles.

Figure 7A:
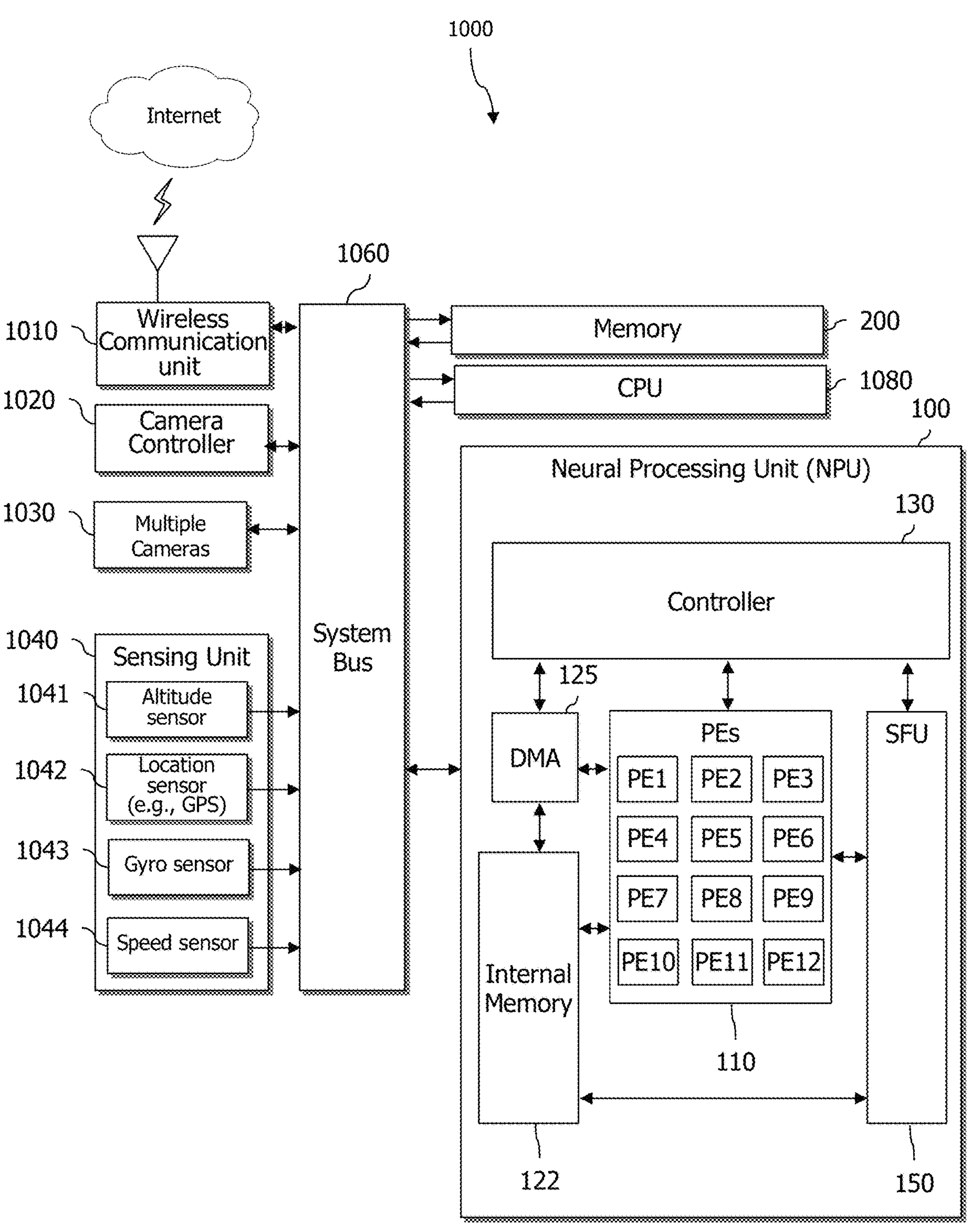
FIG. 7A is a block diagram illustrating an example configuration of the movable apparatus shown in FIG. 6A.

FIG. 7A is a block diagram illustrating an example configuration of the movable apparatus shown in FIG. 6A. Referring to FIG. 7A, the movable apparatus 1000 may include the neural processor 100, memory 200, wireless communication unit 1010, camera controller 1020, multiple cameras 1030, sensing unit 1040, system bus 1060, and CPU 1080 shown in FIG. 1 or 3. Each of the elements of the movable apparatus 1000 described above may include dedicated hardware circuitry.

The wireless communication unit 1010 may include one or more of a 4G communication unit, a 5G communication unit, a 6G communication unit, and a near field communication unit. The 4G communication unit may be for Long Term Evolution (LTE) or LTE-Advanced (LTE-A). The 5G communication part may be for 5G New Radio (5G NR). The near field communications unit may support, for example, wireless LAN (WLAN), wireless-fidelity (Wi-Fi), wireless-fidelity (Wi-Fi) direct, Bluetooth™, radio frequency identification (RFID), infrared data association (IrDA), ultra-wideband (UWB), ZigBee, near field communication (NFC), wireless universal serial bus (Wireless USB), and the like.

The wireless communication unit 1010 may be used to transmit and receive signals to control the movement of the movable apparatus, to transmit captured images, or to transmit inference results by the neural processor.

The camera controller 1020 may receive control signals from the CPU 1080 or the neural processor 100. Upon receiving the control signal, the camera controller 1020 may mechanically or electrically control the plurality of cameras 1030.

The sensing unit 1040 may include an altitude sensor 1041, a position sensor (e.g., GNSS or GPS) 1042, a gyro sensor 1043, and a speed sensor 1044. The altitude sensor 1041 may measure the height at which the movable apparatus 1000 is elevated above the ground. The position sensor 1042 may measure a location coordinate of the movable apparatus 1000. Additionally, the position sensor 1042 may measure a height at which the movable apparatus 1000 is elevated above the ground. The velocity sensor 1044 may measure the velocity as well as the acceleration of the movable apparatus 1000. However, the examples of the present disclosure are not limited thereto, and the sensing unit 1040 may be configured to include at least one particular sensor. For example, an altitude sensor 1041 may be included in a drone, but may be excluded in a robot such as a humanoid.

The sensing unit 1040 may pass the measured data to the CPU 1080 or the neural processor 100, transmit it to the Internet via the wireless communication unit 1010, or pass it to a terminal of a user who is controlling the movable apparatus 1000 via the wireless communication unit 1010. Such sensing data may be referred to as metadata.

The system bus 1060 may provide an interface connecting the wireless communication portion 1010, the camera controller 1020, the sensing unit 1040, the memory 200, the CPU 1080, and the neural processor 100 to each other.

The memory 200 may store information about a neural network model. The neural network model may be a type of CNN, such as Yolo. The information about the neural network model stored in the memory 200 may include information about the number of layers of the neural network model, the number of channels per layer, and the weights used for each channel within each layer.

The neural processor 100 may include a plurality of processing elements 110, internal memory 120, a controller 130, a special function unit (SFU) 150, and a direct memory access (DMA) 125 that accesses and controls the internal memory 120, as shown in FIG. 3 or 5. Also, although not shown in FIG. 7A, the neural processor 100 may further include an interface 140, as shown in FIG. 3 or FIG. 5.

The plurality of processing elements 110 and/or SFUs 150 in the neural processor 100 may perform computation associated with a neural network model trained to output an inference result for detecting or tracking a subject, which is at least one object, based on the one or more images obtained from the multiple cameras 1030, for each layer of the neural network model.

Based on the inference results of the neural processor 100, the CPU 1080 may determine a movement path or a movement direction of the movable apparatus 1000, and then control the movable apparatus 1000 to move in the determined movement path or movement direction.

To do so, the CPU 1080 may receive measurement data from the sensing unit 1040. For example, the CPU 1080 may determine a flight path of the movable apparatus 1000, a flight speed, a flight altitude, and the like, by comparing the location information measured via the location sensor 1042 with the destination location information. Further, the CPU 1000 may determine whether the movable apparatus 1000 is flying normally by comparing the determined flight speed and the determined flight altitude with measurements obtained from the altitude sensor 1041, the gyro sensor 1043, or the speed sensor 1044. Thus, the movable apparatus 1000 may continuously control the flight of the movable apparatus 1000.

Further, the CPU 1080 may determine a travel path or a direction of travel of the movable apparatus 1000. The CPU 1080 may control the movable apparatus 1000 to move in the determined travel path or direction of travel.

Further, the CPU 1080 may receive an inference result (i.e., an object detection or tracking result) from the neural processor 100.

Figure 7B:
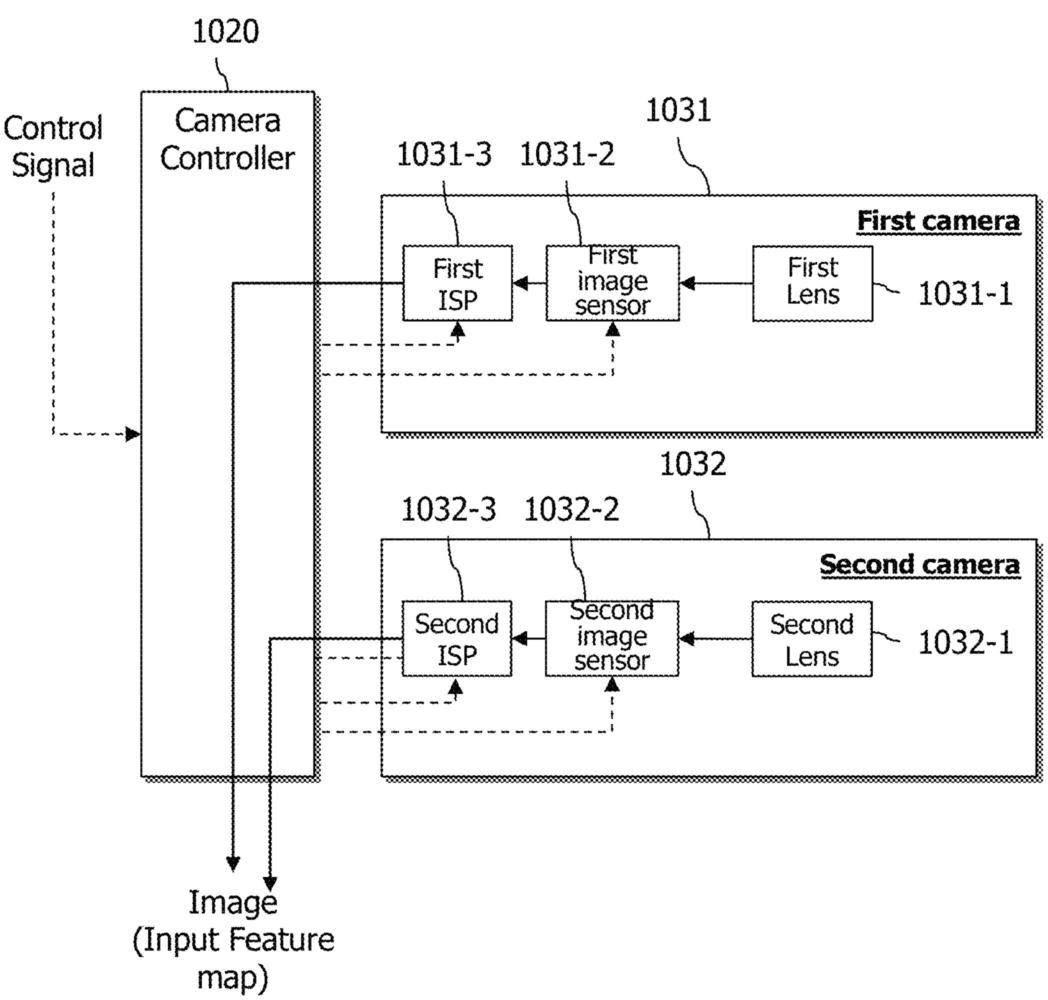
FIG. 7B is a block diagram illustrating a configuration of the camera controller and the multiple cameras shown in FIG. 7A.

FIG. 7B is a block diagram illustrating a configuration of the camera controller and the multiple cameras shown in FIG. 7A.

Referring to FIG. 7B, the multiple cameras 1030 may include a first camera 1031 and a second camera 1032 as an example. The first camera 1031 and the second camera 1032 may be coupled to the camera controller 1020.

The first camera 1031 may include a first lens 1031-1, a first image sensor 1031-2, and a first image signal processor (ISP) 1031-3.

The second camera 1032 may include a second lens 1032-1, a second image sensor 1032-2, and a second ISP 1032-3.

The camera controller 1020 may be coupled to and may control the first ISP 1031-3, the first image sensor 1031-2, and the first lens 1032-1 of the first camera 1031. The camera controller 1020 is coupled to and may control the second ISP 1032-3, the second image sensor 1032-2 of the second camera 1032.

The camera controller 1020 may receive a control signal from the CPU 1080. According to the received control signal, the camera controller 1020 may control the frame per second (FPS) of the first camera 1031, and/or may control the FPS of the second camera 1032 by sending frame rate signals to the first and second cameras 1031, 1032.

As described above, the movable apparatus 1000 may be equipped with multiple cameras 1030 to capture surround images of the front, rear, and other sides.

However, the power consumption may become excessively large for the neural processor 100 to process the front image, the rear image, the left image, and the right image. In particular, in the case of the battery-powered movable apparatus 1000, large power consumption is a major problem because it lowers the operation time. The first disclosure described hereinafter beneficially improve the operation time of the apparatus.

On the other hand, in order for the movable apparatus 1000 to perform high-level operations, a professional operator may be required to monitor the situation in real time. The second disclosure described hereinafter beneficially addresses this issue.

<Example Movable Apparatus>

A movable apparatus can be equipped with multiple cameras (i.e., multichannel cameras) to capture surround images from the front, back, and sides. However, the power consumption for the AI to process the front, rear, left, and right images can be excessive. This is particularly problematic for battery-powered, movable apparatus, this is a big problem because high power consumption reduces run time.

The movable apparatus may have to travel for long periods of time, so it is beneficial if the power consumption of its AI systems is lower. The movable apparatus may benefit from a quicker determination if it is traveling at a higher speed. Therefore, it is advantageous if the movable apparatus may have its AI systems process at a speed that match the high speed of the device.

If the movable apparatus can actively describe the situation on site, it can provide more diverse information. For this reason, the movable apparatus may be capable of speech recognition, object recognition, and text generation.

I-1. First Scheme of the First Disclosure

The first disclosure of the present disclosure may provide a scheme where, in particular, the images of interest are processed at a higher speed and the images of no interest are processed at a lower speed to reduce power consumption. These images of interest and images of no interest may be one of the front image, the rear image, the left image, and the right image.

FIG. 8 is a flow diagram illustrating a first scheme of the first disclosure. Referring to FIG. 8, the CPU 1080 of the movable apparatus 1000 may first determine S1110 a direction of movement via the gyro sensor 1043 or the like. For example, the CPU 1080 may determine whether the movable apparatus 1000 is moving forward or backward.

Next, the CPU 1080 may determine S1120 which of the multiple cameras 1030 corresponds to the moving direction, and then select that camera.

Thereafter, the CPU 1080 may increase S1130 the frames per second (FPS) of the selected camera. To do so, the CPU 1080 may communicate a control signal to the camera controller 1020. Then, the camera controller 1020 may control an ISP and/or an image sensor in the selected camera to increase the FPS of the selected camera. Additionally, the camera controller 1020 may set a register value of the ISP and/or image sensor in response to the control signal. The register values may include, for example, FPS of the output video, resolution of the output video, or the like. Accordingly, the camera controller 1020 may be configured to adjust the FPS of each camera and/or adjust the resolution of each camera. In some examples, the camera controller 1020 may be configured to adjust the FPS of a particular camera or adjust the resolution of a particular camera.

On the other hand, the power consumption of the neural processor 100 may increase according to the increase in FPS of the selected camera. To address this, said CPU 1080 may reduce the FPS of other cameras that are not selected. To do so, the CPU 1080 may pass control signals to the camera controller 1020. The camera controller 1020 may then control the ISP and/or image sensor within said other unselected camera to reduce the FPS of the other unselected camera.

Figure 9A:
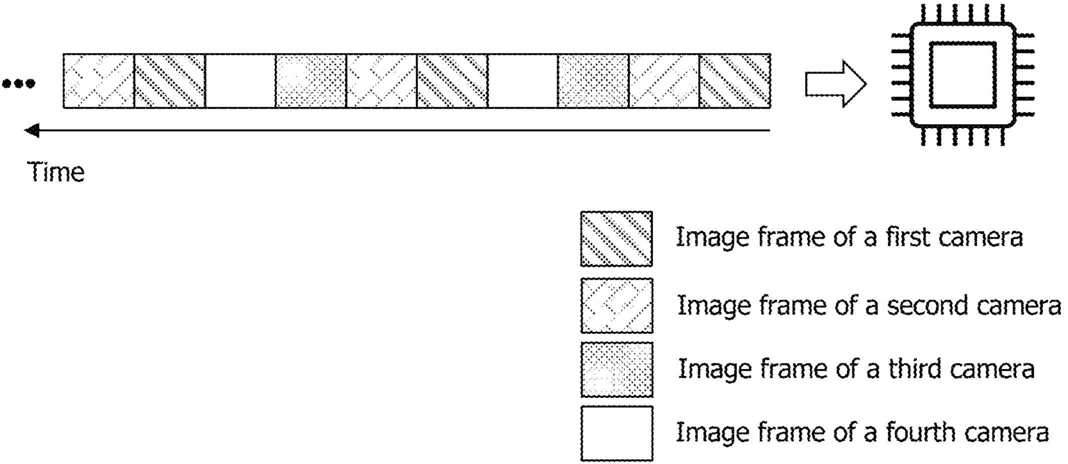
FIGS. 9A through 9C are example diagrams illustrating the first scheme, according to one embodiment.
Figure 9B:
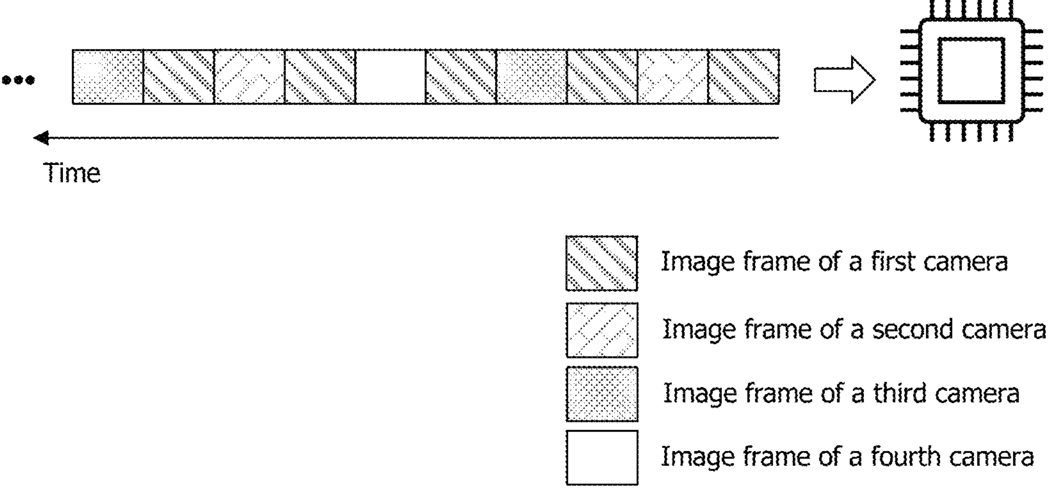
Figure 9C:
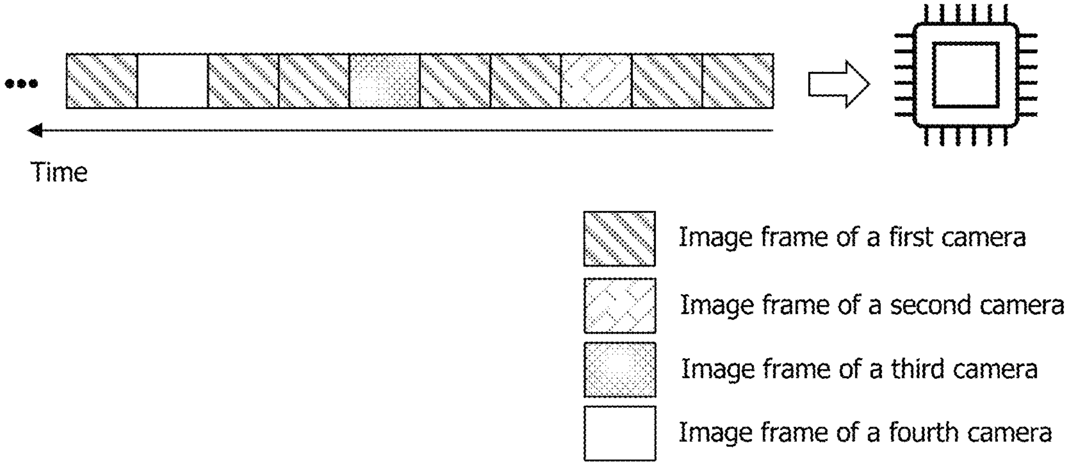

FIG. 9A illustrates images input to the neural processor 100 when the movable apparatus 1000, e.g., a drone, robot, and the like is in place, FIG. 9B illustrates images input to the neural processor 100 when the movable apparatus 1000 is moving in a direction facing the first camera (e.g., the first direction), and FIG. 9C illustrates images input to the neural processor 100 when a movement speed of the movable apparatus 1000 is increased in the direction facing the first camera (e.g., the first direction). The increase in the movement speed may be configured to be determined based on an acceleration, or may be configured to be determined based on a preset threshold speed. The increase in movement speed may be determined based on either an acceleration parameter or a preset threshold speed. Furthermore, as the traveling speed increases, the FPS (frames per second) may be adjusted to a higher value compared to a relatively lower speed, as time-critical decision-making becomes necessary. To elaborate, there may be at least one threshold speed. For example, the threshold speed may include a first threshold speed (e.g., 50 km/h) and a second threshold speed (e.g., 100 km/h).

As illustrated in FIG. 9A, when the movable apparatus 1000, such as a drone, remains stationary, images from the four cameras may be sequentially input to the neural processor 100. In this configuration, the neural processor 100 may be designed to process multiple channels of video frames using a time-division technique.

When the movable apparatus 1000, such as a drone, moves in the direction aligned with the first camera, as illustrated in FIG. 9B, the sequence of image frames input to the neural processor 100 may include a frame from the first camera, a frame from the second camera, a frame from the first camera, a frame from the third camera, a frame from the first camera, and a frame from the fourth camera, and so on. In other words, out of a total of ten image frames, five are from the first camera. Consequently, the FPS of the first camera is increased, while the FPS of the other cameras is proportionally decreased.

If the movable apparatus 1000, such as a drone, increases its movement speed in the direction aligned with the first camera, the sequence of image frames input to the neural processor 100 may be adjusted as follows: a frame from the first camera, a frame from the first camera, a frame from the second camera, a frame from the first camera, a frame from the first camera, a frame from the third camera, a frame from the first camera, and so on, as shown in FIG. 9C. In other words, out of a total of ten image frames, seven are from the first camera. Consequently, the FPS of the first camera is increased, while the FPS of the other cameras is decreased. This indicates that the number of image frames from the first camera input to the neural processor 100 within a certain time is relatively higher compared to those from the other cameras.

As an embodiment of an implementation of the first scheme, the movable apparatus 1000 may be, for example, a drone. For example, the drone may include a gyro sensor, a plurality of cameras, and a neural network semiconductor that processes a plurality of images output from the plurality of cameras to detect and track a target. Furthermore, the movable apparatus, such as a drone, may include a controller configured to determine the direction of movement using a gyro sensor and to input image frames from the plurality of cameras to the neural processor. The controller may achieve this by increasing the FPS of the camera corresponding to the moving direction while decreasing the FPS of one or more cameras not aligned with the moving direction. Additionally, it may be configured to reduce the resolution of cameras not corresponding to the moving direction.

In some examples, the plurality of cameras may be configured such that, as the travel speed increases, the FPS of the camera aligned with the direction of travel is further increased, while the FPS of the camera positioned in other directions is correspondingly reduced.

By adjusting the distribution of image frames processed within a certain period of time—without increasing the overall FPS of images input to the neural processor—this configuration allows for an increase in the number of image frames captured by the cameras in the direction of travel, thereby avoiding an increase in power consumption.

The neural processor 100 may be designed to accelerate object detection inference computations for each image frame by executing the neural network model using the plurality of processing elements 110 and the SFU 150.

Figure 10:
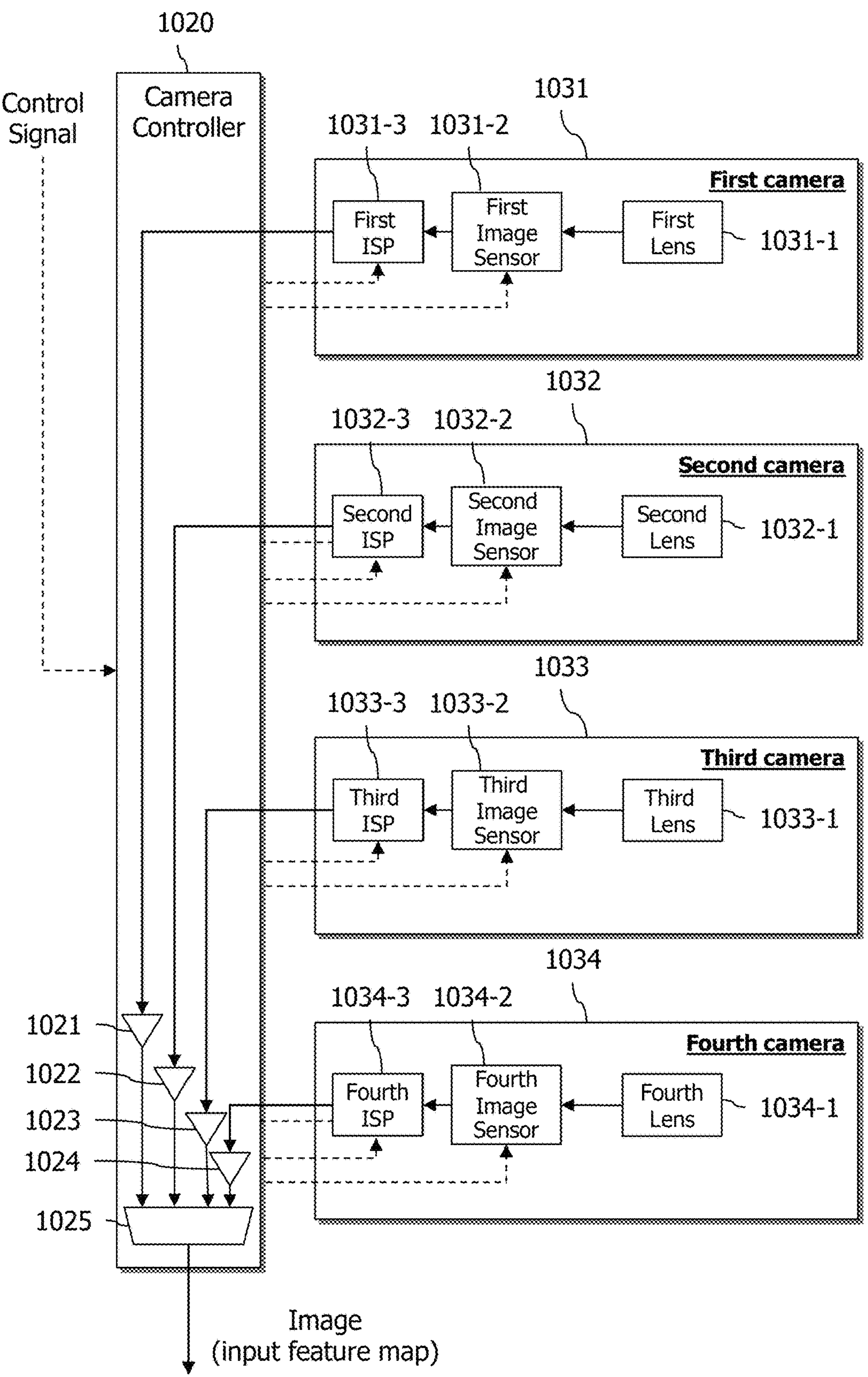
FIG. 10 is a block diagram illustrating a configuration of the controller and the multiple cameras for the first scheme of the first disclosure, according to one embodiment.

FIG. 10 is a block diagram illustrating a configuration of the controller and the multiple cameras for the first scheme of the first disclosure.

Referring to FIG. 10, the multiple cameras 1030 may include a first camera 1031, a second camera 1032, a third camera 1033, and a fourth camera 1034. The first camera 1031, the second camera 1032, the third camera 1033, and the fourth camera 1034 may be coupled to the camera controller 1020.

The first camera 1031 may include a first lens 1031-1, a first image sensor 1031-2, and a first image signal processor (ISP) 1031-3.

The second camera 1032 may include a second lens 1032-1, a second image sensor 1032-2, and a second ISP 1032-3.

The third camera 1033 may include a third lens 1033-1, a third image sensor 1033-2, and a third ISP 1033-3.

The fourth camera 1034 may include a fourth lens 1034-1, a fourth image sensor 1034-2, and a fourth ISP 1034-3.

The camera controller 1020 may be coupled to, and may control, the first ISP 1031-3, the first image sensor 1031-2 of the first camera 1031. The camera controller 1020 may be coupled to, and may control, the second ISP 1032-3, the second image sensor 1032-2 of the second camera 1032. The camera controller 1020 may be coupled to, and may control, the third ISP 1033-3, the third image sensor 1033-2 of the third camera 1033. Further, the camera controller 1020 may be coupled to, and may control, the fourth ISP 1034-3, the fourth image sensor 1034-2 of the fourth camera 1034.

The camera controller 1020 may include a plurality of up/down samplers 1021, 1022, 1023, 1024, and a multiplexer 1025. An up/down sampler may refer to a circuit configured to include the functions of an up sampler and a down sampler.

The up sampler may be referred to as a frame rate converter, a frame interpolator, or the like, and may increase the frame rate of the input video. The down sampler may be referred to as a frame skipper, a frame dropper, a frame decimator, and the like, and may reduce the frame rate of the input video. Furthermore, examples of the present disclosure are not limited to up and down samplers, and may be configured to include only up samplers or only down samplers.

The number of the plurality of up/down samplers may be the same as the number of the multiple cameras, i.e., each up/down sampler may correspond to each camera.

Referring to FIG. 10, as an example, the apparatus may include four cameras: the first camera 1031, the second camera 1032, the third camera 1033, and the fourth camera 1034. Similarly, the apparatus may include four up/down samplers: the first up/down sampler 1021, the second up/down sampler 1022, the third up/down sampler 1023, and the fourth up/down sampler 1024.

The first up/down sampler 1021 may either increase or decrease the number of images output per unit of time from the first camera 1031. Similarly, the second up/down sampler 1022 may adjust the number of images output per unit time from the second camera 1032. The third up/down sampler 1023 may adjust the number of images output per unit time from the third camera 1033. The fourth up/down sampler 1024 may adjust the number of images output per unit time from the fourth camera 1034.

For example, when the movable apparatus 1000 moves in a direction aligned with the first camera 1031, the camera controller 1020 may control the first up/down sampler 1021 to perform up sampling, thereby increasing the number of images output per unit time from the first camera 1031. Alternatively, the camera controller 1020 may control the second up/down sampler 1022 to perform down sampling, thereby decreasing the number of images output per unit time from the second camera 1032. Similarly, the camera controller 1020 may control the third up/down sampler 1023 to perform down sampling, thereby decreasing the number of images output per unit time from the third camera 1033. Additionally, the camera controller 1020 may control the fourth up/down sampler 1024 to perform down sampling, thereby decreasing the number of images output per unit time from the fourth camera 1034.

The multiplexer 1025 may adjust the multiplexing order according to the direction in which the movable apparatus 1000 is moved.

For example, when the movable apparatus 1000 moves in a direction facing the first camera 1031, the multiplexer 1025 may cause the frame sequence of images to be in the order of a frame from the first camera, a frame from the second camera, a frame from the first camera, a frame from the third camera, a frame from the first camera, and a frame from the fourth camera, as shown in FIG. 9B.

In another example, when the movable apparatus 1000 is moving at an increased speed in the direction facing the first camera 1031, the multiplexer 1025 may cause the multiplexing sequence to be in the order of a frame from the first camera, a frame from the first camera, a frame from the second camera, a frame from the first camera, a frame from the first camera, a frame from the third camera, and so on, as shown in FIG. 9C.

The neural processor 100 may be configured to accelerate the object detection inference computation of the respective image frames according to processing the computation of the neural network model utilizing the plurality of processing elements 110 and SFU 150.

I-2. Second Scheme of the First Disclosure

Figure 11:
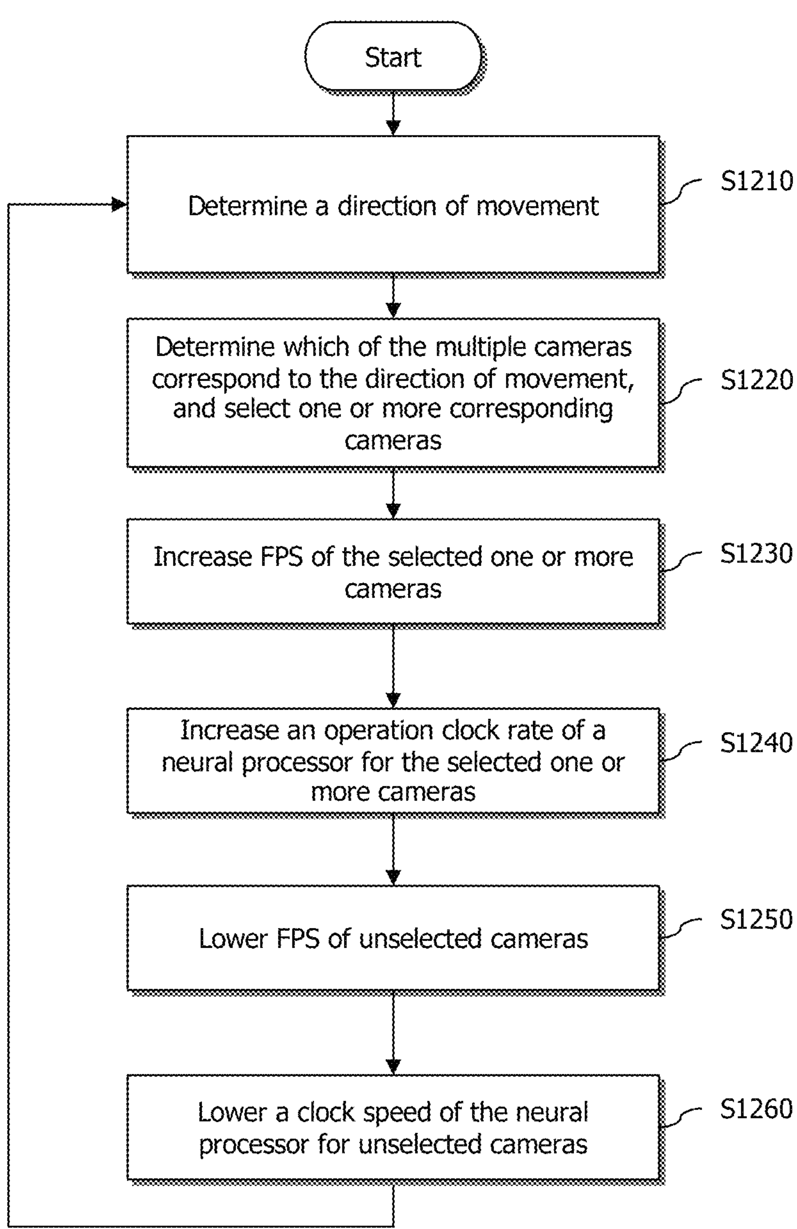
FIG. 11 is a flow diagram illustrating a second option of the first disclosure, according to one embodiment.

FIG. 11 is a flow diagram illustrating a second scheme of the first disclosure. Referring to FIG. 11, the CPU 1080 of the movable apparatus 1000 first determines S1210 a direction of movement (or flight) via the gyroscope 1043 or the like. For example, the CPU 1080 may determine whether the direction of travel is forward or backward, etc.

Next, the CPU 1080 determines S1220 which of the multiple cameras 1030 corresponds to the direction of movement of the movable apparatus 1000, and then selects one or more corresponding cameras.

Thereafter, the CPU 1080 increases S1230 the FPS of the selected camera. Here, the technical feature that the CPU 1080 determines, selects, and controls may mean that this is done by software processed on the CPU 1080.

Then, the operation clock rate of the neural processor 100 for the selected cameras is increased S1240.

On the other hand, the FPS of the unselected cameras is reduced S1250 and the clock speed of the neural processor 100 for those cameras is lowered S1260, thereby, reducing the power consumption.

Figure 12:
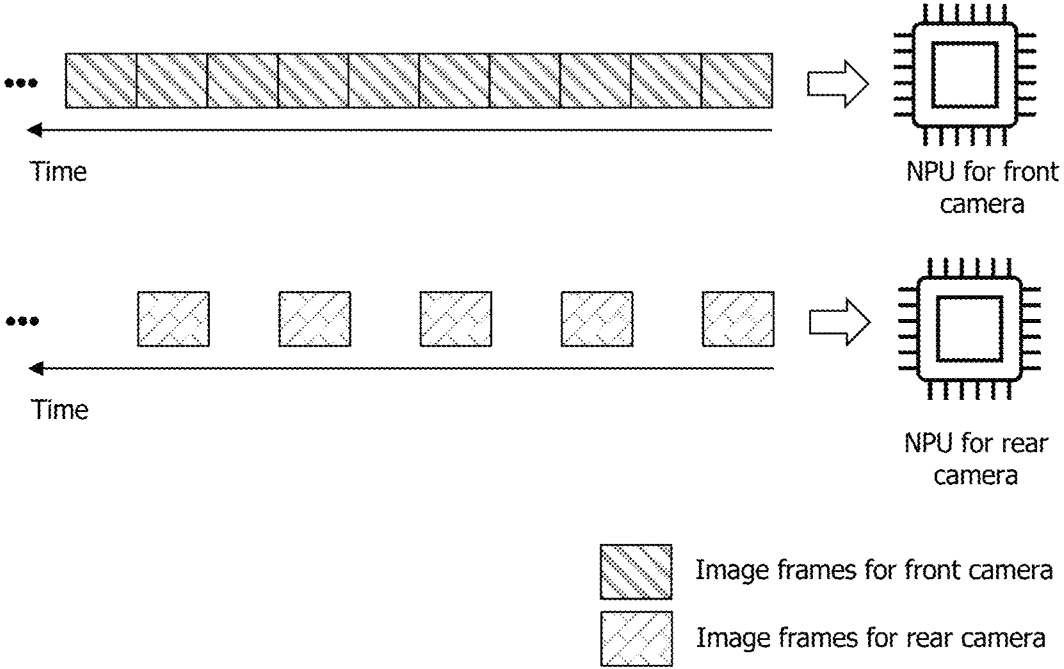
FIG. 12 is an example diagram illustrating the second option, according to one embodiment.

As can be seen with reference to FIG. 12, the number of image frames input to the neural processor for the rear camera is lower than the number of image frames input to the neural processor for the front camera. In other words, the FPS of the first camera is higher, while the FPS of the second camera is lower.

The neural processor for the front camera may be operated at a higher clock speed, while the neural processor for the rear camera may be operated at a lower clock speed.

In this way, by increasing only the number of image frames processed by the forward-facing camera without increasing the total number of images processed over a given period (i.e., maintaining the same FPS), it is possible to avoid increasing power consumption.

As an embodiment of an implementation of the second scheme, the movable apparatus 1000 may be, for example, a drone. For example, the drone may include a gyro sensor, a first camera, a second camera, a first neural processor (i.e., NPU) for processing images from the first camera, and a second neural processor for processing images from the second camera. Additionally, the drone may determine its flight direction through the gyro sensor and increase the FPS of a camera positioned in the flight direction from among the first and second cameras. The drone may also increase the operating clock of a specific neural processor for the selected camera while reducing the FPS of the camera positioned in a direction other than the flight direction and lowering the operating clock of the neural processor for the other camera. This may be controlled by a controller.

II. the Second Disclosure

According to the second embodiment, controlling a movable apparatus 1000, such as a robot, through voice commands is provided. For example, when a user issues a voice command such as “find the cat” or “bring me the umbrella,” the movable apparatus 1000 can understand and perform the command by processing a vision-language model. To achieve this, the neural processor 100 can be configured to process vision-language models (VLMs).

Visual-language models may include, for example, Contrastive Language-Image Pre-training (CLIP), LLaMA, Chat-GPT, Contrastive Learning with Image and Language Representations (ALIGN), Foundational Language And Vision Architecture (FLAVA), Vision-and-Language Transformer (ViLT), Learning Cross-Modality Encoder Representations from Transformers (LXMERT), Bidirectional Encoder Representations from Transformers (VisualBERT), Deep Visual-Semantic Embeddings (DeViSE), Visual-Semantic Embedding (VSE++), Universal Image-Text Representation Learning (UNITER), VilBERT, Bootstrapping Language-Image Pretraining (BLIP), Text-Contrastive Learning (TCL), Cross-Modal Clustering of Text and Images (COOT), Align Before Fusion (ALBEF), and the like. Generally, models like CLIP are referred to as vision-language or multimodal models because they process both visual (image) and textual (language) data. These models typically integrate both modalities (visual and linguistic) into a unified framework to perform tasks such as image-to-text retrieval, zero-shot learning, and multimodal understanding.

Figure 13A:
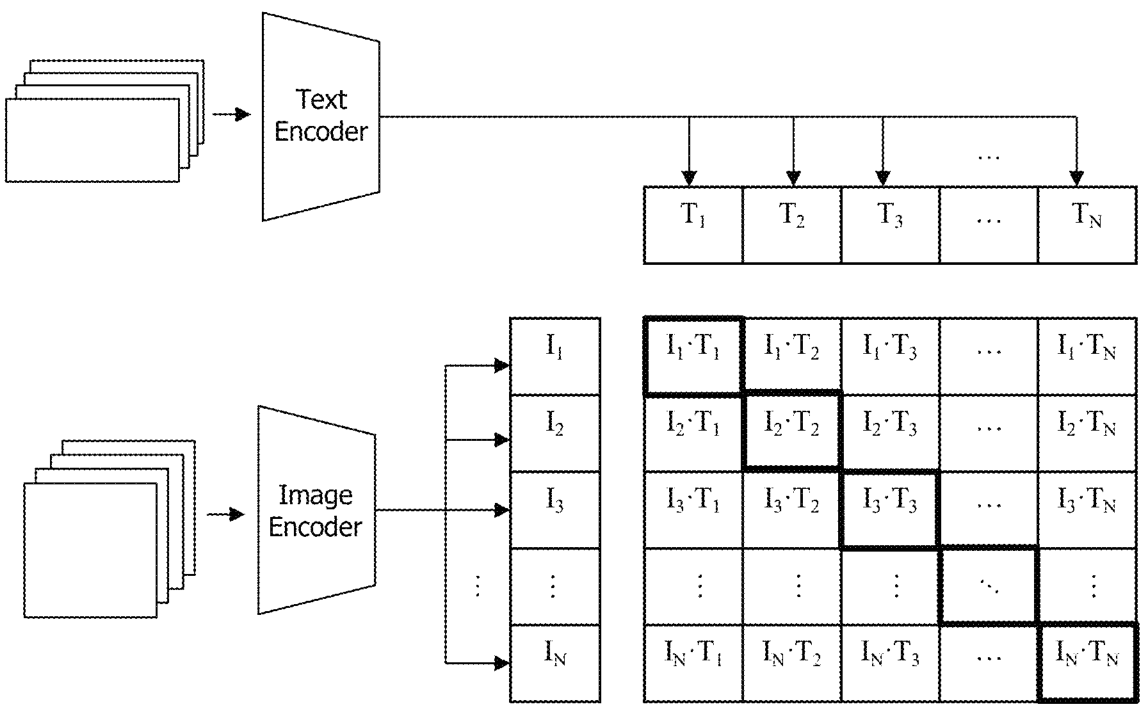
FIG. 13A is an example diagram illustrating an inference process of an example vision-language model, according to one embodiment.

FIG. 13A is an example diagram illustrating an inference process of an example vision-language model. Referring to FIG. 13A, the neural processor 100 can be configured to process vision-language models. The vision-language model may, for example, include an image encoder and a text encoder. The image encoder may be, for instance, a pre-trained CNN model or a Vision Transformer (ViT) model. The text encoder may be, for example, a Transformer-based model such as Generative Pretrained Transformer (GPT) or a version of BERT. The neural processor 100 can be configured to accelerate the computation of the vision-language model using multiple processing elements 110 and an SFU 150.

First, the neural processor 100 may receive image frames and processes the computation of the image encoder of the vision-language model. Specifically, when processing the vision-language model, the neural processor 100 may receive image frames from at least one camera. To convert the input images into a format that can be processed by the neural network model, image preprocessing may be optionally performed. This preprocessing may include operations such as resizing and normalization. The image encoder may be structured as a network architecture such as a convolutional neural network (CNN) or a Vision Transformer (ViT). The image passes through multiple layers of the neural network and is transformed into a high-dimensional embedding. This embedding has fixed dimensions and can compress and represent the semantic features of the image.

Next, the neural processor 100 may process the computation of the text encoder of the vision-language model by receiving text that describes each image. In this case, the neural processor 100 may receive text when processing the vision-language model. The text may be in natural language form, such as prompts, captions or descriptions. The text encoder tokenizes the input text. The text input is processed through the text encoder. Typically, a Transformer-based neural network is used for the text encoder. After tokenization, the text is input into the encoder and undergoes multiple layers of self-attention and feed-forward layers, ultimately being transformed into a fixed-dimensional embedding. This embedding is represented in the same space as the image embedding and can be considered as a vector that summarizes the semantic features of the text.

The neural processor 100 may operate to calculate the similarity between the two embeddings after the image and text have been converted into embedding spaces. This is typically performed using cosine similarity, which measures the angle between two vectors to determine their similarity. For example, the cosine similarity value ranges from −1 to 1, where a value closer to 1 indicates a stronger connection between the image and the text.

The vision-language model may be configured to find semantic alignment between images and text based on similarity. For example, it can compare multiple text descriptions with a single image to output the text with the highest similarity, or it can identify the image that best matches a given text from a set of images. In other words, the vision-language model generates embeddings for both images and text simultaneously, allowing it to be used for tasks such as searching for images from text or retrieving text from images.

Figure 13B:
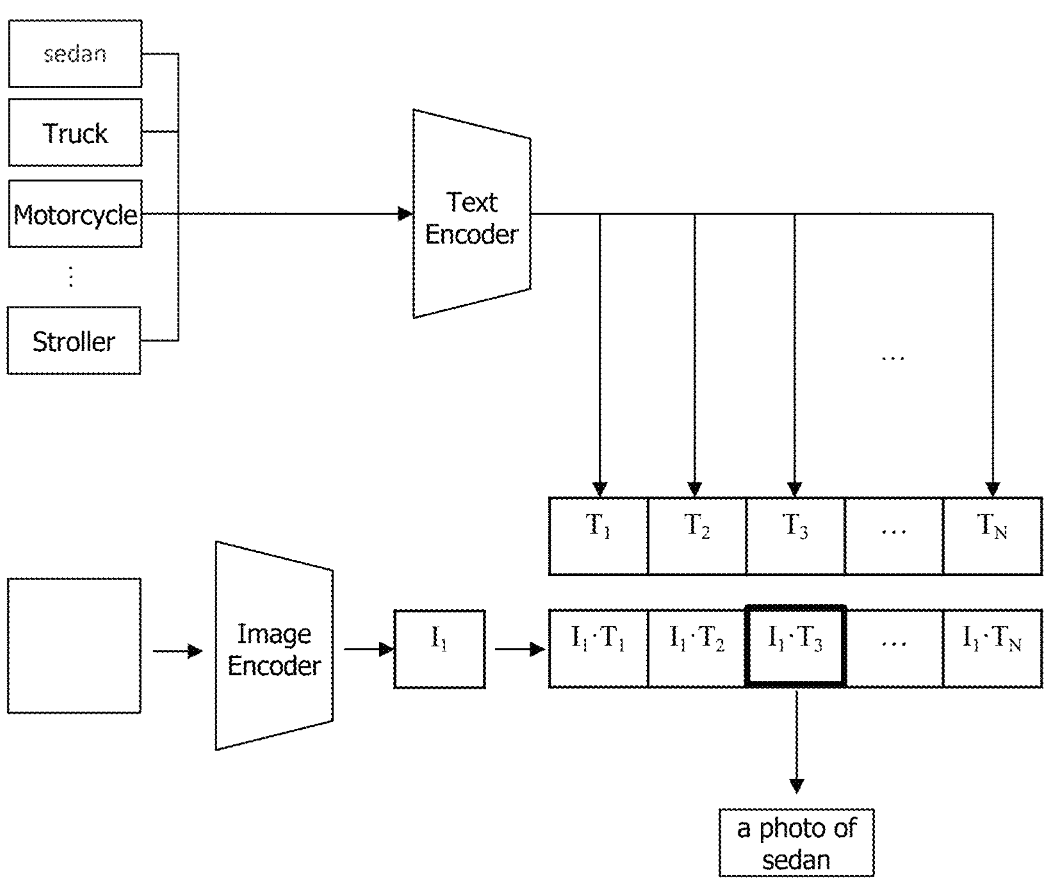
FIG. 13B is an example of utilization of an example vision-language model, according to one embodiment.

FIG. 13B is an example of utilization of an example vision-language model. Referring to FIG. 13B, an example is shown where the neural processor 100 processes the Zero-Shot Prediction inference operation of the vision-language model using pretrained weights.

The neural processor 100 may receive a specific command as text input. For example, when a robot equipped with the neural processor 100 is tasked with providing home care for a patient, text such as “describe the patient’s health condition” or “report the patient’s surroundings for risk factors” is input to the robot. In response, the neural processor 100 inputs the text into the text encoder to calculate the text vector. The neural processor 100 then calculates the similarity between the text vector and the vector of the image being inferred, selecting the text with the relatively higher similarity value. The image vector can be calculated using an image encoder that employs pretrained weights.

Figure 14:
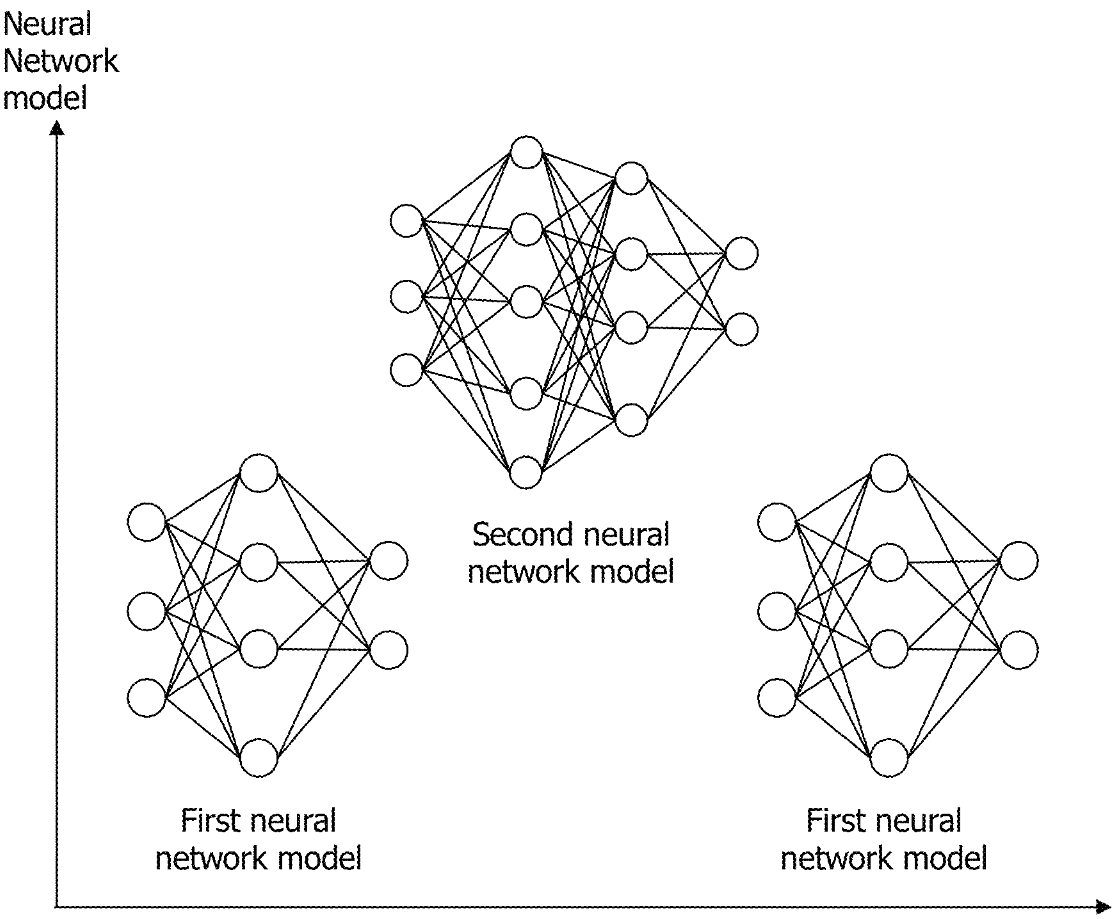
FIG. 14 illustrates an example utilization of an example first disclosure of the present disclosure and an example utilization of the second disclosure, according to one embodiment.

FIG. 14 illustrates examples of a first and a second disclosure of the present disclosure.

Referring to FIG. 14, an example of an embodiment of the present disclosure is illustrated, in which the movable apparatus 1000 may be configured such that the first neural network model from the first disclosure and the second neural network model from the second disclosure collaborate to operate together.

For instance, the neural processor 100 may process the first neural network model from the first disclosure and then proceed to process the second neural network model from the second disclosure. Specifically, the neural processor 100 may operate to track objects of a specific class (e.g., car, drone, human, dog, sign and the like) during a first period, using the first neural network model (e.g., an object detection or tracking model). The specific class could be a target (e.g., a patient, customer, or user), and the object detection neural network model may track the object by processing face recognition or voice recognition models. In this case, the neural processor 100 of the movable apparatus 1000 may be configured to adjust the frame processing speed of the first and second cameras based on the object detection, with different FPS settings for each camera.

For example, if the neural processor 100 detects the target (e.g., the patient) in the video from the first camera but fails to detect the patient in the second camera's video, the FPS for the first camera may be set higher than that for the second camera. This configuration allows for real-time tracking of the target while reducing the power consumption of the movable apparatus 1000. During a second period, following the first period, the neural processor 100 may operate to process specific text commands using the second neural network model (e.g., a vision-language model).

For instance, using the vision-language model, the neural processor 100 can analyze video related to the target according to the text command and generate a report in text. If, for example, the target has collapsed, the movable apparatus 1000 can be programmed to call an ambulance through the wireless communication unit 1010. The device can also be programmed to send the location information using the location sensor 1042. If a fire is detected around the target, the device can call a fire truck through the wireless communication unit 1010 and also send the location information.

If, for example, the target (e.g., the robot's owner) issues a voice command asking to bring a specific object, the voice command can be converted into text and processed by the neural processor 100. The movable apparatus 1000 can then transform the target class of the first neural network model from the robot's owner to the requested object and operate to track the object.

In summary, the first and second neural network models may be processed sequentially by the neural processor 100. The FPS for processing the first neural network model and the FPS for processing the second neural network model may be set differently. As the second neural network model typically requires more computation and consumes more power than the first, reducing the processing frequency of the second model can extend the operating time of the movable apparatus 1000.

For example, if no specific text command is input, the second neural network model may not be processed by the neural processor 100, and only the first neural network model may be processed. The first period for processing the first neural network model may thus be set to a longer duration than the second period for processing the second neural network model.

In certain configurations, the first camera's video may be processed by the first neural network model, while the second camera's video may be processed by the second neural network model. In such cases, one camera may operate for autonomous driving, while the other may generate a report describing the surrounding environment in text.

The examples presented herein are not limited to the ones described, and it is possible for the various examples disclosed herein to be combined and implemented in various ways.

Figure 15:
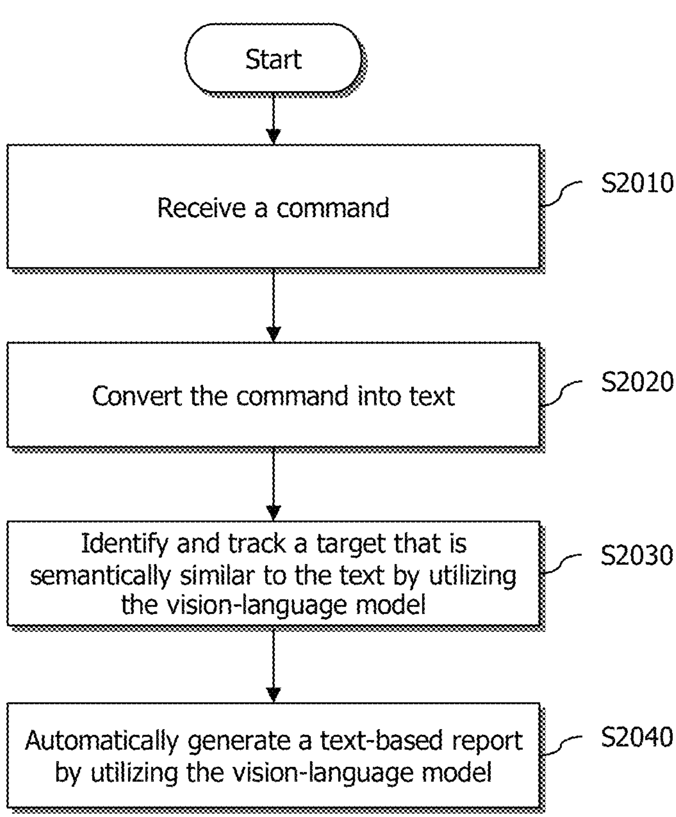
FIG. 15 is a flow diagram illustrating a method according to the second disclosure, according to one embodiment.

FIG. 15 is a flow diagram illustrating a method according to the second disclosure. With reference to FIG. 15, upon receiving a command S2010, if the command is in the form of speech, neural processor 100 may convert the command into text S2020. Typically, the process of converting speech to text is based on speech-to-text STT technology. For example, if the user issues a voice command saying "find the cat," neural processor 100 may convert the speech into text data S2020. However, the examples provided in this disclosure are not limited to voice commands. If the command is directly input as text, the step of converting speech to text can be omitted.

Next, the movable apparatus 1000 utilizes the vision-language model to move toward the target (e.g., a cat) that is semantically similar to the text, and the device identifies and tracks the target S2030. Specifically, the movable apparatus 1000 uses the vision-language model to recognize the target associated with the text. The vision-language model, which learns the semantic similarity between text and images, can identify an image related to the word "cat". Using this model, the movable apparatus 1000 may identify and move toward the target in the environment that matches the text, while tracking the target.

While the movable apparatus 1000 identifies and tracks the target, based on images or video captured by the multiple cameras 1030, neural processor 100 again uses the vision-language model to automatically generate a text-based report S2040. This report may be generated based on the similarity between images and text, and may provide detailed descriptions, such as "The cat is climbing up the tree."

This second disclosure may allow users to easily control the movable apparatus 1000 via voice commands, enabling the device to automatically detect and track the target. As a result, the user can find the desired target quickly and accurately through voice commands without complex operations, and perform high-level tasks using the reports generated by the movable apparatus 1000. That is, the movable apparatus 1000 can be programmed to perform specific commands (e.g., tracking specific objects, reporting specific situations, etc.) by utilizing multiple cameras and neural network models. Such technology can be applied in various scenarios, for example, to track the location of a pet or find a specific object.

Embodiments of the Present Disclosure

Embodiments relates a movable apparatus. The apparatus may comprise a sensor, a plurality of cameras, a neural processor configured to detect and track an object by receiving images from the plurality of cameras, and a controller circuit configured to determine a moving direction by the sensor, increase a first frame per second (FPS) of a selected camera among the plurality of cameras corresponding to the moving direction, and decrease a second FPS of at least one other camera among the plurality of cameras corresponding to a different direction.

In one or more embodiments, when speed of the movable apparatus increases, the first FPS may be further increased and the second FPS may be further decreased.

In one or more embodiments, the controller circuit may be configured to: transmit a first control signal to an image signal processor (ISP) of the selected camera, and transmit a second control signal to an ISP of the at least one other camera.

In one or more embodiments, the movable apparatus may comprise a camera controller for the plurality of cameras.

In one or more embodiments, the camera controller may include a plurality of up/down samplers, and a multiplexer.

In one or more embodiments, a number of the plurality of up/down samplers may be the same as a number of the plurality of cameras.

In one or more embodiments, the plurality of up/down samplers may comprise a first up/down sampler and a second up/down sampler.

In one or more embodiments, a first up/down sampler of the plurality of up/down samplers may be configured to perform upsampling on output from the selected camera to increase the first FPS.

In one or more embodiments, a second up/down sampler of the plurality of up/down samplers may be configured to perform down-sampling on output from the at least one other camera to decrease the second FPS.

In one or more embodiments, the multiplexer may be configured to determine a shuffling order for a first image from the first camera and a second image from the second camera of the plurality of cameras based on the moving direction.

In one or more embodiments, the neural processor may comprise: a first neural processor configured to receive images from the first camera among the plurality of cameras and to detect and track a target, and a second neural processor configured to receive images from a second camera among the plurality of cameras and to detect and track the target.

In one or more embodiments, the controller circuit may be configured to increase a clock frequency of the first neural processor and decrease a clock frequency of the second neural processor.

In one or more embodiments, the neural processor may be configured to: convert a voice command into a text prompt; and utilize a vision-language model to identify and track a target that corresponding to the text prompt.

In one or more embodiments, the neural processor may be configured to generate a text-based report by processing the vision-language model with the received images.

In one or more embodiments, the movable apparatus may be one of a drone, an unmanned aerial vehicle (UAV), a robot, or an autonomous vehicle.

Embodiments relates to a method of operating a movable apparatus. The method may comprise receiving images from a plurality of cameras to detect and track a target, determining a moving direction based on sensor output, increasing a first frames per second (FPS) of a selected camera among the plurality of cameras that is corresponding to the moving direction, reducing a second FPS of at least one other camera corresponding to a different direction, and inferencing the images by a neural processor.

In one or more embodiments, the first FPS may be further increased and the second FPS may be further decreased, when speed of the movable apparatus increases.

In one or more embodiments, a clock frequency of a first neural processor of the neural processor processing the selected camera may be increased, and a clock frequency of a second neural processor of the neural processor processing the at least one other camera may be decreased.

In one or more embodiments, a voice command may be converted into a text prompt, and a vision-language model may be utilized to identify and track a target that based on the text prompt.

In one or more embodiments, a text-based report may be generated by processing a vision-language model with the received images.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented in addition to the examples described.

[National R&D Project Supporting This Invention]
[Project Identification Number] Not assigned
[Task Number] R-20240325-023124
[Name of Ministry] Ministry of Science and ICT
[Name of Task Management (Specialized) Institution] Information and Communication Industry Promotion Agency
[Research Project Title] Demonstrate intelligent home services and spread projects
[Research Task Name] Development and demonstration of edge hub-based intelligent home service based on care robot and Matter standard with Generative AI
[Name of the organization performing the task] Hyodol Co., Ltd
[Research Period] 2024 May 1~2024 Dec. 31

What is claimed is:

1. A movable apparatus comprising:
a sensor configured to generate a sensor signal;
a plurality of cameras to capture images;
one or more neural processors configured to detect and track an object by processing the images captured by the plurality of cameras; and
a controller circuit configured to:
determine a moving direction of the movable apparatus by processing the sensor signal,
increase a first frame rate of a selected camera among the plurality of cameras corresponding to the moving direction, and
decrease a second frame rate of each of one or more cameras other than the selected camera.

2. The movable apparatus of claim 1, wherein the controller circuit is further configured to:
further increase the first frame rate and decrease the second frame rate responsive to increase in a speed of the movable apparatus.

3. The movable apparatus of claim 1, wherein the controller circuit is further configured to:
transmit a first control signal to an image signal processor (ISP) of the selected camera to control the first frame rate, and
transmit a second control signal to an ISP of at least one of the one or more cameras to control the second frame rate.

4. The movable apparatus of claim 1, further comprising a camera controller configured to:
receive a control signal from the controller circuit, and
send frame rate signals to the plurality of cameras to set the first frame rate and the second frame rate in accordance with the control signal.

5. The movable apparatus of claim 4, wherein the camera controller includes a plurality of up/down samplers configured to receive the captured images and increase or decrease a frame rate of the captured images to obtain the first frame rate and the second frame rate, and a multiplexer configured to incorporate the captured images into a stream of images.

6. The movable apparatus of claim 5, wherein a number of the plurality of up/down samplers is the same as a number of the plurality of cameras.

7. The movable apparatus of claim 5, wherein the plurality of up/down samplers comprises a first up/down sampler and a second up/down sampler.

8. The movable apparatus of claim 5, wherein a first up/down sampler of the plurality of up/down samplers is configured to perform upsampling on images captured by the selected camera to the first frame rate.

9. The movable apparatus of claim 5, wherein a second up/down sampler of the plurality of up/down samplers is configured to perform down-sampling on images captured by each of one or more cameras to the second frame rate.

10. The movable apparatus of claim 5, wherein the multiplexer is further configured to determine a frame sequence for images captured by the first camera and images captured by the second camera of the plurality of cameras based on the moving direction.

11. The movable apparatus of claim 1, wherein the one or more neural processors comprise:

a first neural processor configured to receive and process images captured by a first camera of the plurality of cameras to detect and track a target, and a second neural processor configured to receive and process images captured by a second camera to detect and track the target.

12. The movable apparatus of claim 11, wherein the controller circuit is further configured to increase a clock frequency of the first neural processor and decrease a clock frequency of the second neural processor.

13. The movable apparatus of claim 1, wherein the one or more neural processors are configured to:

convert a voice command into a text prompt; and utilize a vision-language model to identify and track a target that corresponds to the text prompt.

14. The movable apparatus of claim 1, wherein the one or more neural processors are configured to generate a text-based report by processing a vision-language model with the captured images.

15. The movable apparatus of claim 1, wherein the movable apparatus is one of a drone, an unmanned aerial vehicle (UAV), a robot, or an autonomous vehicle.

16. A method of operating a movable apparatus, comprising:

receiving images captured from a plurality of cameras;

determining a moving direction of the movable apparatus based on a sensor signal;

selecting one of the plurality of cameras that corresponds to the moving direction;

increasing a frame rate of first images captured by a selected camera;

reducing one or more frame rates of second images captured by one or more cameras other than the selected camera; and processing the first images and the second images by one or more neural processors to track and detect a target.

17. The method of claim 16, further comprising:

further increasing the frame rate of the first images and further decreasing the one or more frame rates of the second images responsive to increase in a speed of the movable apparatus.

18. The method of claim 16, further comprising:

increasing a clock frequency of a first neural processor of the one or more neural processors, the first neural processors processing the first images; and decreasing a clock frequency of a second neural processor of the one or more neural processors, the second neural processors processing the second images.

19. The method of claim 16, further comprising:

converting a voice command into a text prompt; and utilizing a vision-language model to identify and track the target based on the text prompt.

20. The method of claim 16, further comprising:

generating a text-based report by processing a vision-language model with the first images and the second images.

* * * * *